(12) United States Patent
Buset et al.

(10) Patent No.: US 12,388,556 B2
(45) Date of Patent: Aug. 12, 2025

(54) SYSTEMS AND METHODS FOR CORRECTING DOWNSTREAM POWER EXCURSIONS DURING UPSTREAM LOADING OPERATIONS IN OPTICAL NETWORKS

(71) Applicant: Infinera Corp., San Jose, CA (US)

(72) Inventors: Jonathan M. Buset, San Jose, CA (US); Daniel Fonseca, San Jose, CA (US); Stephane St. Laurent, Roxboro (CA); Sanjeev Ramachandran, Manipal (IN); Ashok Kunjidhapatham, Devarachikkanahalli (IN)

(73) Assignee: Infinera Corp., San Jose, CA (US)

( * ) Notice: Subject to any disclaimer, the term of this patent is extended or adjusted under 35 U.S.C. 154(b) by 312 days.

(21) Appl. No.: 18/297,431

(22) Filed: Apr. 7, 2023

(65) Prior Publication Data
US 2023/0327794 A1      Oct. 12, 2023

Related U.S. Application Data

(60) Provisional application No. 63/329,225, filed on Apr. 8, 2022.

(51) Int. Cl.
*H04J 14/02*      (2006.01)

(52) U.S. Cl.
CPC .............................. *H04J 14/02126* (2023.08)

(58) Field of Classification Search
CPC .................................................. H04J 14/0221
See application file for complete search history.

(56) References Cited

U.S. PATENT DOCUMENTS

| | | | | |
|---|---|---|---|---|
| 2009/0092391 A1* | 4/2009 | Zong | ..................... | H04J 14/025 398/79 |
| 2014/0233943 A1* | 8/2014 | Yamakami | ........ | H04J 14/02216 398/34 |
| 2019/0149229 A1* | 5/2019 | Yilmaz | ............... | H04L 41/0677 398/10 |

* cited by examiner

*Primary Examiner* — Shi K Li

(57) ABSTRACT

Disclosed herein are methods and systems for correcting power excursions. One exemplary network element may be provided with a processor; a first line port; a flexible ROADM module including a wavelength selective switch, a multiplexer, and one or more control block; a second line port; and a memory storing an orchestrator application and processor-executable instructions. Responsive to receiving a first signal indicative of an impending network state change, the processor-executable instructions cause the processor to pause all power adjustments by the control block on the flexible ROADM module and save at least one power set point value for each active passband from a first optical signal multiplexed into a second optical signal; and responsive to receiving a second signal indicative of the network state change, adjust an optical power of each active passband from the first optical signal multiplexed into the second optical signal using the power set point values.

20 Claims, 13 Drawing Sheets

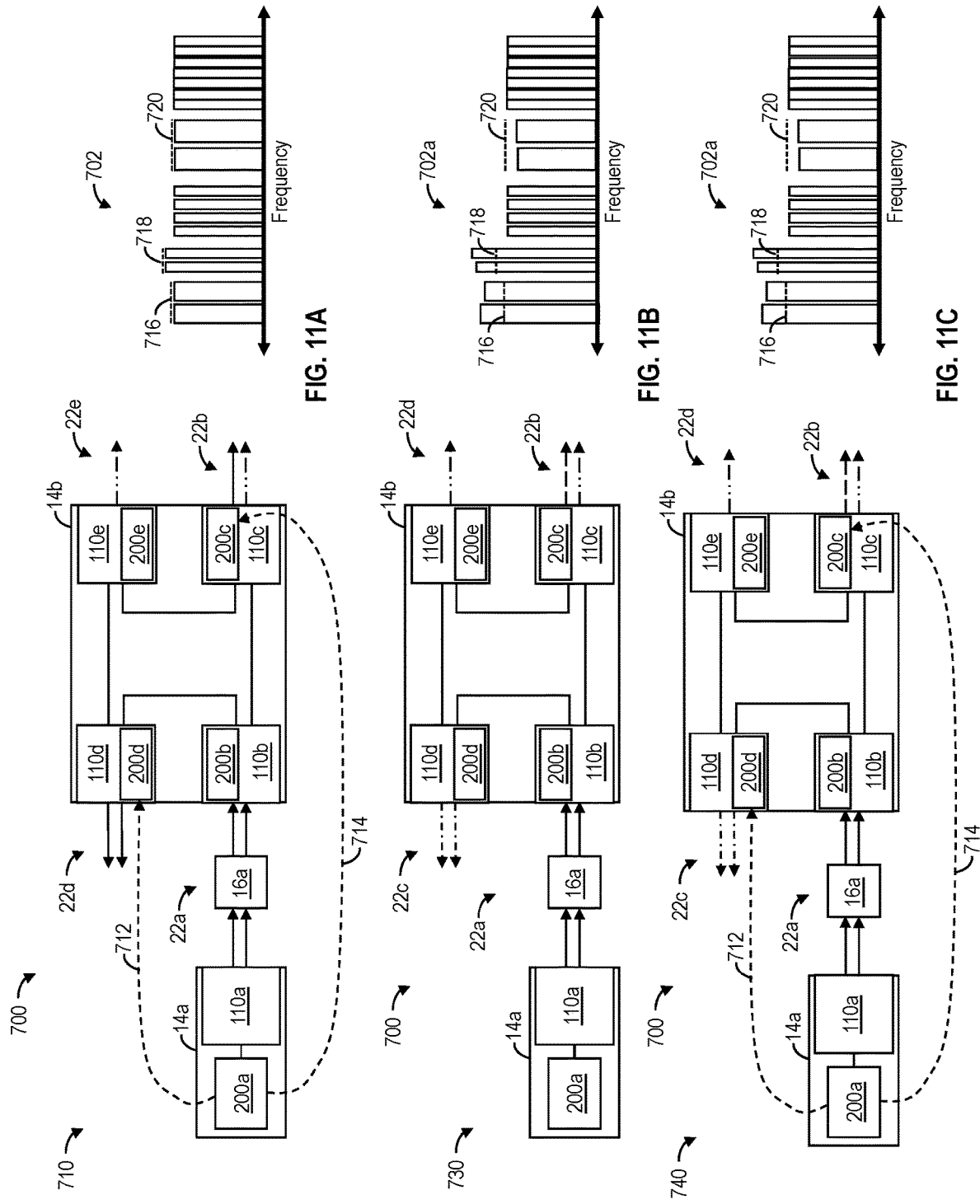

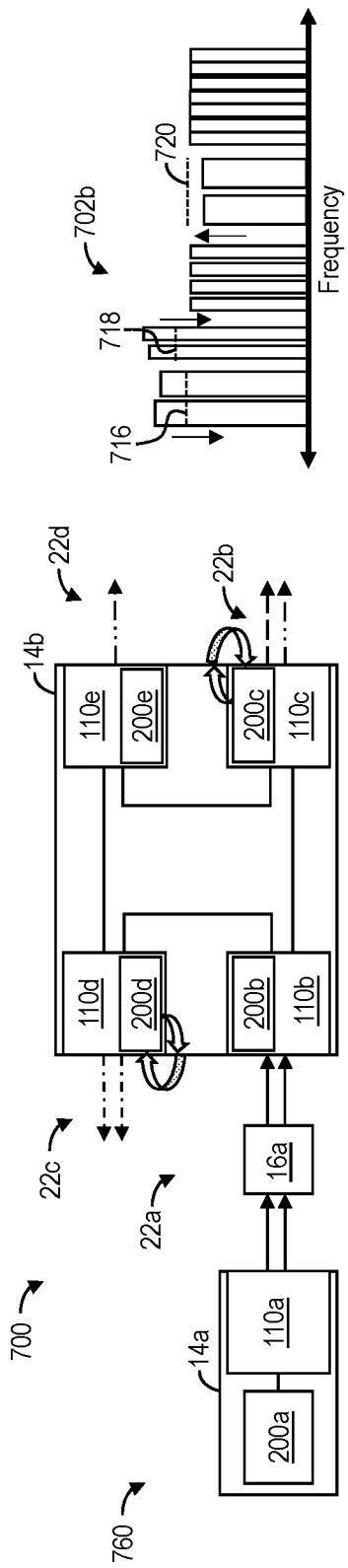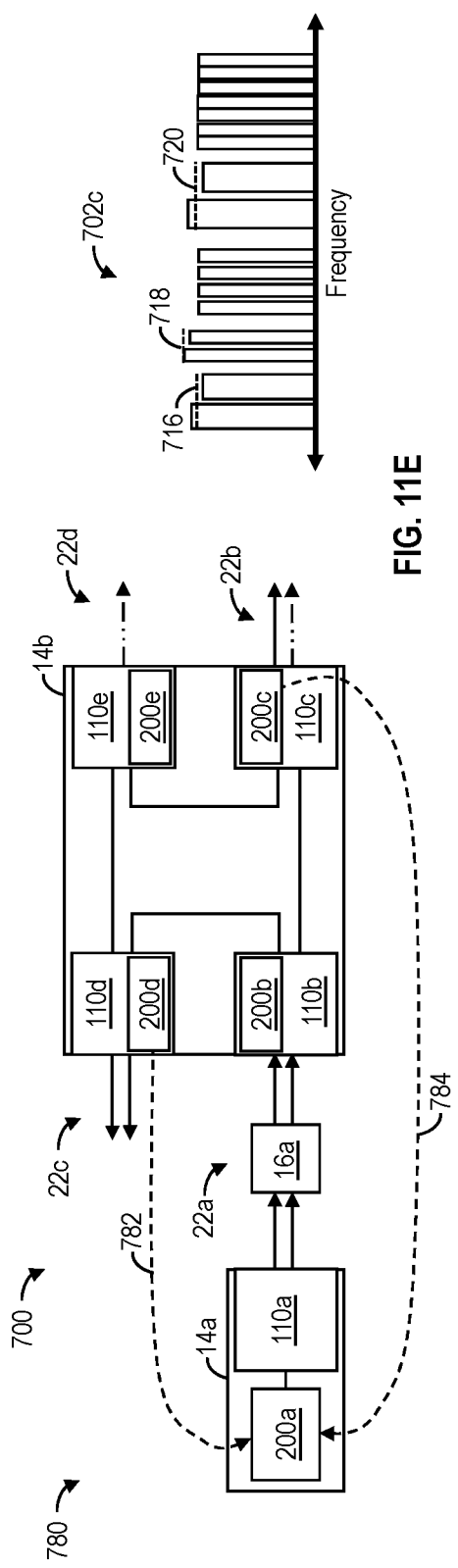

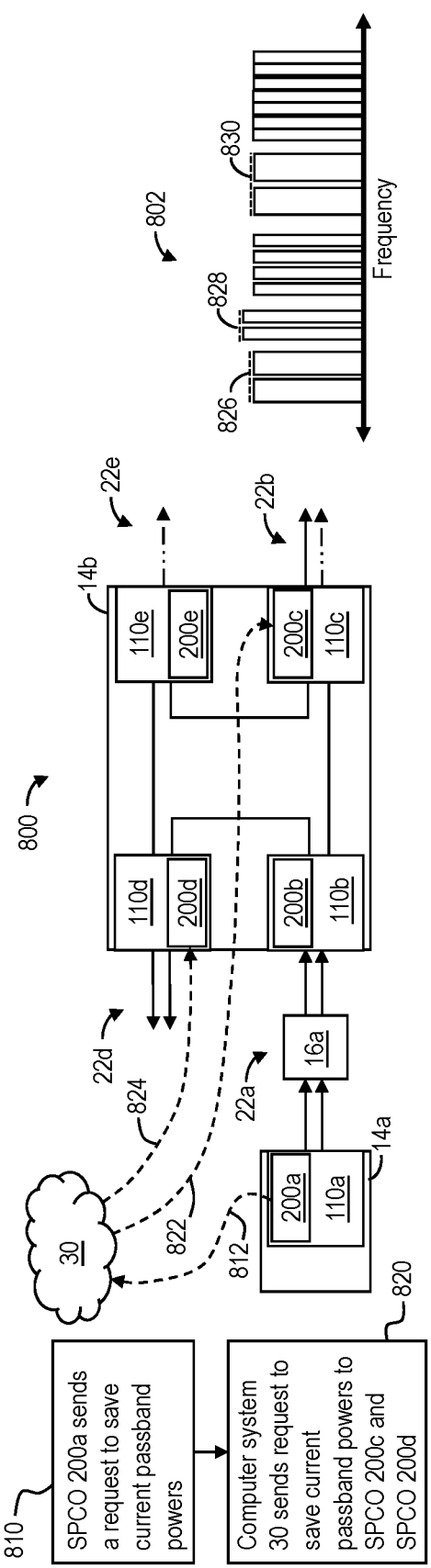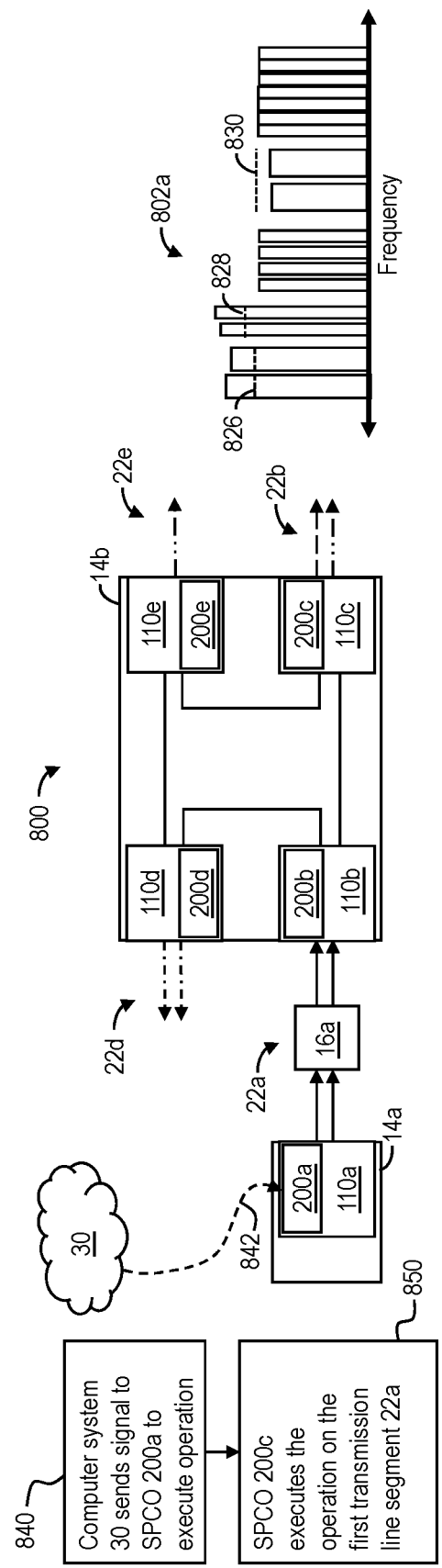
FIG. 12A
FIG. 12B

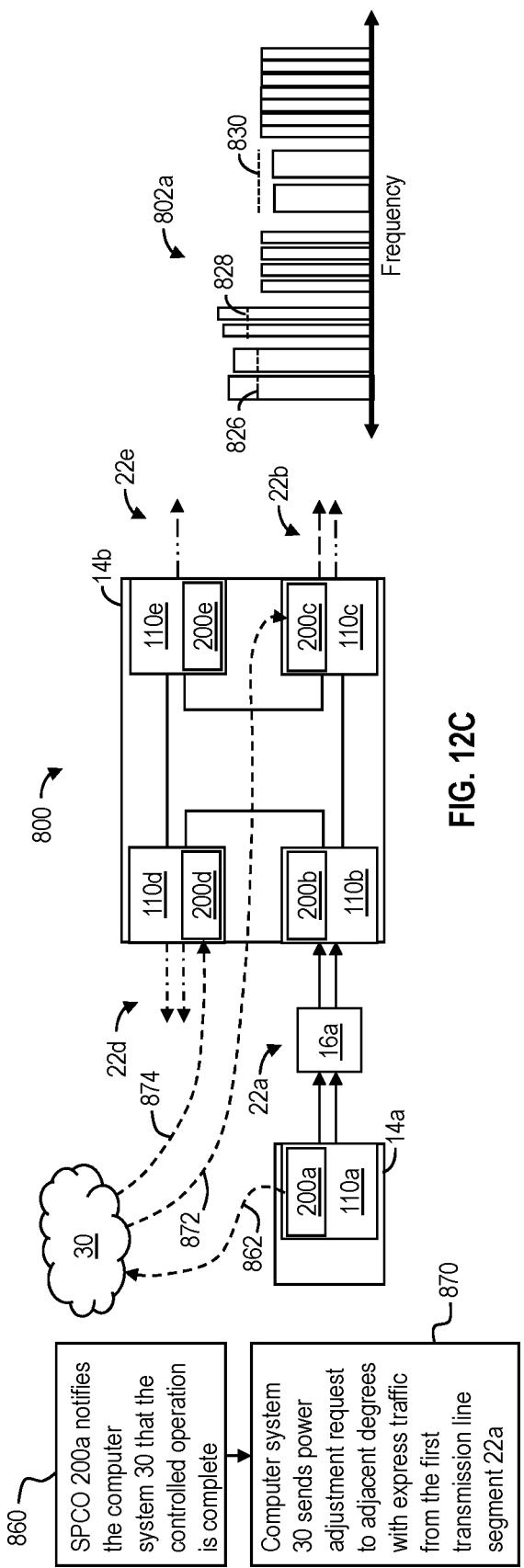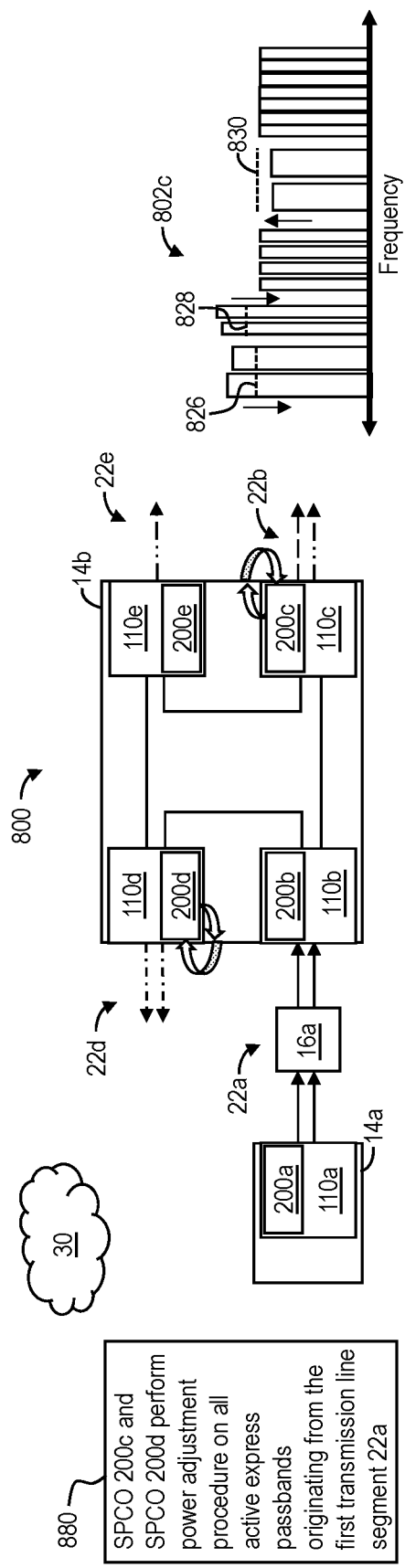

SYSTEMS AND METHODS FOR CORRECTING DOWNSTREAM POWER EXCURSIONS DURING UPSTREAM LOADING OPERATIONS IN OPTICAL NETWORKS

CROSS-REFERENCE TO RELATED APPLICATION

This application claims priority to U.S. Provisional Patent Application No. 63/329,225, filed Apr. 8, 2022, the entire content of which is incorporated herein by reference in its entirety.

DESCRIPTION OF THE PRIOR ART

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wavelength division multiplexing to enable high-bandwidth communication.

Optical networks are a critical component of the global Internet backbone. This infrastructure acts as the underlay, providing the plumbing (e.g., access, metro, and long-haul networks) for all other communications to take place. In a traditional 7-layer Open Systems Interconnection (OSI) model, Optical networks constitute the Layer 1 functions, providing digital transmission of bit streams transparently across varying distances over a chosen physical media (in this case, fiber optic). Optical networks also encompass an entire class of devices (which are referred to as Layer 0), which purely deal with optical photonic transmission and wavelength division multiplexing (WDM). This includes amplification, (re-)generation, and optical add/drop multiplexing (OADM). The most widely adopted Layer 1/Layer 0 transport networking technologies today, referred to as Optical Transport Networks (OTN), are based on ITU-T standards. Both of these classes of networks are connection-oriented and circuit-switched in nature.

Dense Wavelength Division Multiplexing (DWDM) is an optical transmission technology that uses a single fiber optic line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems C+L optical line systems may be susceptible to experiencing optical power transients during loading operations due to Stimulated Raman Scattering (SRS) effect across the different frequency bands. This can lead to traffic drop on pre-existing services in one frequency band if there is a significant loading change in the other frequency band. Existing data signals may suffer traffic loss if the power transient is large enough and the optical signal does not have sufficient design margin to overcome the impairments. Keeping the power transients below allowable levels is essential to having a deployable system since the residual power transients will propagate to downstream segments via the egress Express traffic.

Commercial optical transmission systems use automatic gain control (AGC) software to properly configure each active element in the network to a set point that gives the desired performance. When the network state changes, for example by a controlled action (e.g., adding and/or removing wavelengths), or an uncontrolled action (e.g., a change in fiber span loss, unexpected equipment failure, etc.), the AGC software needs to run to re-optimize all the operating set points. Running an AGC cycle can take multiple minutes to converge on a single network segment, depending on the implementation and control architecture. In network segments with Express traffic, that is, where optical wavelengths are optically routed from one network segment to another, a change in the local network segment may require AGC cycles to be run in downstream segments that contain dependent traffic. Further AGC cycles also need to be run on downstream segments with dependent traffic to an upstream event If multiple operations are required to be run sequentially on a network segment, the downstream segments with dependent traffic may also need to run AGC cycles after each operation in the sequence to prevent power excursions from accumulating in the downstream nodes. This has significant timing implications for system performance since each AGC cycle can take multiple minutes to run on a single segment, and running on depending downstream segments will block further actions on the segment of interest.

SUMMARY OF THE INVENTION

In C+L-band networks, services in a particular band (i.e., the C-band or the L-band) should be carefully loaded to minimize the effects of optical power changes on pre-existing services in the other band. This is due to the SRS effect. In C-band networks, services in a particular part of the spectrum may be loaded independently and without consideration for pre-existing services in another part of the spectrum. However, Optical power control functionality for C+L Band requires orchestration and network-wide coordination to avoid transients and SRS tilt implications. In order to accomplish this, a Service and Power Control Orchestrator (SPCO) is used.

In one implementation, the problems of mitigating or limiting transients and the SRS effect when loading services in a C+L band optical network is solved by orchestration and network-wide coordination of optical power control functionality as addressed by a network element as disclosed herein. The network element may comprise a processor; a first line port optically coupled to a first optical fiber link carrying a first optical signal having a first plurality of passbands; a flexible ROADM module including a wavelength selective switch in optical communication with the first line port, a multiplexer, and one or more control block, and being operable to selectively multiplex the first optical signal into a second optical signal having a second plurality of passbands, the one or more control block operable to control the wavelength selective switch and the multiplexer; a second line port optically coupled to a second optical fiber link and operable to carry the second optical signal having the second plurality of passbands, the second line port in optical communication with the wavelength selective switch; and a memory comprising a non-transitory processor-readable medium storing an orchestrator application having one or more service component, and storing processor-executable instructions that when executed by the processor cause the processor to: responsive to receiving a first signal indicative of an impending network state change, pause all power adjustments by the control block on the flexible ROADM module and save at least one power set point value for each active passband from the first optical signal multiplexed into the second optical signal, the network state change being responsive to service activation or service deactivation affecting the first optical signal; responsive to receiving a second signal indicative of the network state change, adjust an optical power of each active passband from the first optical signal multiplexed into the second optical signal using the power set point values.

The exemplary network element, wherein the one or more service component is an orchestration control protocol, and wherein the orchestration control protocol, in communication with the orchestration application, determines the at least one power set point value for each active passband from the first optical signal multiplexed into the second optical signal and saves the at least one power set point value for each active passband in the memory.

The exemplary network element, wherein adjusting the optical power of each active passband from the first optical signal multiplexed into the second optical signal using the power set point values is defined further as providing instructions to the wavelength selective switch to cause the wavelength selective switch to selectively attenuate wavelengths of light within at least one active passband.

The exemplary network element, wherein adjusting the optical power of each active passband from the first optical signal multiplexed into the second optical signal using the power set point values is defined further as providing instructions to the wavelength selective switch to cause the wavelength selective switch to selectively amplify wavelengths of light within at least one active passband.

The exemplary network element, wherein adjusting the optical power of each active passband from the first optical signal multiplexed into the second optical signal using the power set point values is defined further as adjusting the power level of each passband independently of other passbands.

The exemplary network element, wherein adjusting the optical power of each active passband from the first optical signal multiplexed into the second optical signal using the power set point values is defined further as dynamically adjusting the power level of passbands based on real-time network conditions.

The exemplary network element, wherein the degree further comprises an optical power monitor configured to measure the power level of individual passbands and provide feedback to the processor for adjusting the power levels.

The exemplary network element, wherein after the optical power of each active passband from the first optical signal multiplexed into the second optical signal using the power set point values, the processor executable instructions cause the processor to determine if a delta power threshold value relative to the power set point values for each active passband from the first optical signal multiplexed into the second optical signal has been exceeded; and if the delta power threshold value relative to the power set point values for each active passband from the first optical signal multiplexed into the second optical signal has not been exceeded, the processor executable instructions cause the processor to generate and transmit a third signal via the first line port, the third signal indicating the optical power adjustment of each active passband from the first optical signal multiplexed into the second optical signal was successful; or if the delta power threshold value relative to the power set point values for each active passband from the first optical signal multiplexed into the second optical signal has been exceeded, the processor executable instructions cause the processor to generate and transmit a fourth signal via the first line port, the fourth signal indicating the optical power adjustment of each active passband from the first optical signal multiplexed into the second optical signal was not successful.

In one aspect of the present disclosure, a network element is provided, comprising: a first flexible ROADM module comprising: a first system port; a second system port; a first line port optically coupled to a first optical fiber link carrying a first optical signal having a first group of passbands; a first processor; and a first memory comprising a non-transitory processor-readable medium storing a first orchestrator application having one or more first service component, and storing first processor-executable instructions; a second flexible ROADM module comprising: a third system port; a fourth system port; a second line port optically coupled to the first line port of the first flexible ROADM module; a second processor; and a second memory comprising a non-transitory processor-readable medium storing a second orchestrator application having one or more second service component, and storing second processor-executable instructions; a third flexible ROADM module comprising: a fifth system port; a sixth system port; a third line port optically coupled to the first line port of the first flexible ROADM module; a third processor; and a third memory comprising a non-transitory processor-readable medium storing a third orchestrator application having one or more third service component, and storing third processor executable instructions; wherein the second processor-executable instructions, when executed by the second processor, cause the second processor to: responsive to receiving a first signal indicative of an impending network state change, pause all power adjustments by a second control block on the second flexible ROADM module and save at least one first power set point value for each active passband from the first group of passbands from the first flexible ROADM module, the network state change being responsive to service activation or service deactivation affecting the first optical signal; and responsive to receiving a second signal indicative of the network state change, adjust an optical power of each active passband from the first optical signal using the first power set point values; and wherein the third processor-executable instructions, when executed by the third processor cause the third processor to: responsive to receiving the first signal indicative of the impending network state change, pause all power adjustments by a third control block on the third flexible ROADM module and save at least one second power set point value for each active passband from the first group of passbands from the first flexible ROADM module, the network state change being responsive to service activation or service deactivation affecting the first optical signal; and responsive to receiving the second signal indicative of the network state change, adjust an optical power of each active passband from the first optical signal using the second power set point values.

The exemplary network element, wherein the one or more first service component is a first orchestration control protocol, the one or more second service component is a second orchestration control protocol, and the one or more third orchestration protocol is a third orchestration control protocol; and wherein the second orchestration control protocol, in communication with the second orchestration application, determines the at least one first power set point value for each active passband from the first group of passbands from the first flexible ROADM module and saves the at least one first power set point value for each active passband in the second memory; and wherein the third orchestration control protocol, in communication with the third orchestration application, determines the at least one second power set point value for each active passband from the first group of passbands from the first flexible ROADM module and saves the at least one second power set point value for each active passband in the third memory.

In one aspect of the present disclosure, an optical transport network is discloses, comprising: a first network element comprising a first processor, a first wavelength selective switch having a first line port and a first system port, and a first memory comprising a non-transitory processor-readable medium storing a first orchestrator application having at least one first service component, and first processor-executable instructions; a second network element comprising a second processor, a second wavelength selective switch having a second line port and a second system port and exposing a control block, and a second memory comprising a non-transitory processor-readable medium storing a second orchestrator application having at least one second service component, and second processor-executable instructions; and an optical fiber link optically coupled to the first line port and the second line port, the optical fiber link operable to carry an optical signal having the optical service in a plurality of passbands; wherein the first processor executable instructions, when executed by the first processor, cause the first processor to generate a first signal and transmit the first signal via the first line port to the second network element, the first signal indicative of an impending state change on the first network element; responsive to receiving the first signal, the second processor executable instructions cause the second processor to pause all power adjustments by the control block and save at least one power set point value for each active passband in the optical signal; responsive to saving at least one power set point for each active passband in the optical signal, the second processor executable instructions cause the second processor to generate a second signal and transmit the second signal to the first network element via the second line port, the second signal indicating that the second network element is prepared for the state change; responsive to receiving the second signal, the first processor executable instructions cause the first network element to perform the state change; responsive to completing the state change, the first processor executable instructions cause the first processor to generate a third signal and transmit the third signal to the second network element via the first line port, the third signal indicating that the state change is complete; responsive to receiving the third signal, the second processor executable instructions cause the second processor to adjust an optical power of each active passband in the optical signal using the power set point values.

Implementations of the above techniques include methods, apparatus, systems, networks, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features, and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings:

FIGS. 11A-11E illustrate an exemplary method for correcting downstream power excursions in one implementation of an optical transport network having a distributed control architecture in accordance with the present disclosure.

FIGS. 12A-12E illustrate an exemplary method for correcting downstream power excursions in one implementation of an optical transport network having a centralized control architecture in accordance with the present disclosure.

DETAILED DESCRIPTION

Figure 1:
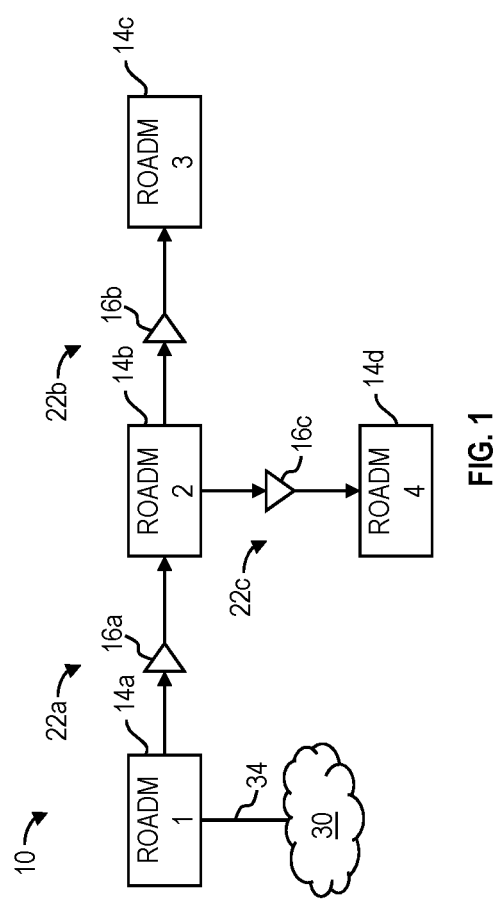
FIG. 1 is a block diagram of an exemplary implementation of an optical transport network constructed in accordance with the present disclosure.

The following detailed description of exemplary embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein are for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one implementation," "some implementations," "an implementation," "one example," "for example," or "an example" means that a particular element, feature, structure, or characteristic described in connection with the embodiment/implementation/example is included in at least one embodiment/implementation/example and may be used in conjunction with other embodiments/implementations/examples. The appearance of the phrase "in some embodiments" or "one example" or "in some implementations" in various places in the specification does not necessarily all refer to the same embodiment/implementation/example, for example.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory memory. Exemplary non-transitory memory may include random access memory, read-only memory, flash memory, and/or the like. Such non-transitory memory may be electrically based, optically based, and/or the like.

Software may include one or more processor-readable instruction that when executed by one or more component, e.g., a processor, causes the component to perform a specified function. It should be understood that the algorithms described herein may be stored on one or more non-transitory processor-readable medium, which is also referred to herein as a non-transitory memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

The optical network has one or more band. A band is a complete optical spectrum carried on the optical fiber. Depending on the optical fiber used and the supported spectrum which can be carried over long distances with the current technology, relevant examples of the bands are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a spectral slice (a "slice") may represent a spectrum of a particular size in a frequency band (e.g., 12.5 gigahertz ("GHz"), 6.25 GHz, 3.125 GHz, etc.). For example, a 4.8 terahertz ("THz") frequency band may include 384 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channel may be called a channel group. Spectral loading may also be described as the addition of one or more channel group to a specific spectrum of light described by the light's wavelength to be supplied onto the optical fiber as the optical signal.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A wavelength Selective Switch is a programmable device having source and destination fiber ports where the source and destination fiber ports and associated attenuation can be specified for a particular passband with a minimum bandwidth.

A reconfigurable optical add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band. ROADM functions are facilitated via usage of a combination of colorless, directionless, and contentionless (CDC) optical devices, which may include wavelength selective switches (WSS) and/or Multicast switches (MCS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is Optical Transport Networks (OTN) (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

As used herein, a transmission line segment (which may be referred to as an optical link or an optical multiplex section) is the portion of a transmission line from a first node (e.g., a first ROADM) transmitting a transmission signal to a second node (e.g., a second ROADM) receiving the transmission signal. The transmission line segment may include one or more optical in-line amplifier situated between the first node and the second node. In some implementations, an optical multiplex section (OMS) has the same scope as the transmission line segment (TLS). In some implementations, the OMS may be a subset of a TLS. In some implementations, OMS-C(C-Band) and OMS-L (L-Band) are combined together in an optical link or TLS. In some implementations, TLS may be used synonymously with Optical Link. An Optical Link may be composed of OMSs including OMS-C and OMS-L.

Referring now to the drawings, and in particular to FIG. 1, shown therein is a diagram of an exemplary implementation of an optical transport network 10 constructed in accordance with the present disclosure. The optical transport network 10 is depicted as having a plurality of network elements 14a-n, including a first network element 14a, a second network element 14b, a third network element 14c, and a fourth network element 14d. Though four network elements 14 are shown for the purposes of illustration, it will be understood that the plurality of network elements 14a-n may comprise more or fewer network elements 14. Data transmitted within the optical transport network 10 may be transmitted along optical paths formed by a first transmission line segment 22a, a second transmission line segment 22b, and a third transmission line segment 22c. For instance, data transmitted from the first network element 14a to the second network element 14b may travel along the optical path formed from the first transmission line segment 22a.

The optical transport network 10 may be provided with one or more optical in-line amplifiers (ILA) disposed in the transmission line segments 22a, 22b, and 22c such as a first ILA 16a, a second ILA 16b, and a third ILA 16c disposed in the transmission line segments 22a, 22b, and 22c, respectively.

In one embodiment, a user may interact with a computer system 30, e.g., via a user device, that may be used to communicate with one or more of the network elements 14a-n (hereinafter "network element 14") via a communication network 34. Each element of the computer system 30 may be partially or completely network-based or cloud-based, and may or may not be located in a single physical location.

In some implementations, the computer system 30 (described below in reference to FIG. 2 in more detail) may comprise a processor and a memory having a data store that may store data such as network element version information, firmware version information, sensor data, system data, metrics, logs, tracing, and the like in a raw format as well as transformed data that may be used for tasks such as reporting, visualization, analytics, signal routing, power loading operations and/or coordination, etc. The data store may include structured data from relational databases, semi-structured data, unstructured data, time-series data, and binary data. The data store may be a data base, a remote accessible storage, or a distributed filesystem. In some embodiments, the data store may be a component of an enterprise network.

In some implementations, the computer system 30 is connected to one or more network element 14 via the communication network 34. In this way, the computer system 30 may communicate with each of the one or more network element 14, and may, via the communication network 34 transmit or receive data from each of the one or more network element 14. In other embodiments, the computer system 30 may be integrated into each network element 14 and/or may communicate with one or more pluggable card within the network element 14. In some embodiments, the computer system 30 may be a remote network element.

The communication network 34 may permit bi-directional communication of information and/or data between the computer system 30 and/or the network elements 14 of the optical transport network 10. The communication network 34 may interface with the computer system 30 and/or the network elements 14 in a variety of ways. For example, in some embodiments, the communication network 34 may interface by optical and/or electronic interfaces, and/or may use a plurality of network topographies and/or protocols including, but not limited to, Ethernet, TCP/IP, circuit switched path, combinations thereof, and/or the like. The communication network 34 may utilize a variety of network protocols to permit bi-directional interface and/or communication of data and/or information between the computer system 30 and/or the network elements 14.

The communication network 34 may be almost any type of network. For example, in some embodiments, the communication network 34 may be a version of an Internet network (e.g., exist in a TCP/IP-based network). In one embodiment, the communication network 34 is the Internet. It should be noted, however, that the communication network 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 34 is the Internet, a primary user interface of the computer system 30 may be delivered through a series of web pages or private internal web pages of a company or corporation, which may be written in hypertext markup language, JavaScript, or the like, and accessible by the user. It should be noted that the primary user interface of the computer system 30 may be another type of interface including, but not limited to, a Windows-based application, a tablet-based application, a mobile web interface, a VR-based application, an application running on a mobile device, and/or the like. In one embodiment, the communication network 34 may be connected to one or more of the user devices, computer system 30, and the network elements 14a-n.

The optical transport network 10 may be, for example, made up of interconnected individual nodes (that is, the network elements 14). The optical transport network 10 may include any type of network that uses light as a transmission medium. For example, the optical transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical transport network 10 may perform one or more functions described as being performed by another one or more of the devices of the optical transport network 10. Devices of the computer system 30 may interconnect via wired connections, wireless connections, or a combination thereof. For example, in one embodiment, the user device and the computer system 30 may be integrated into the same device, that is, the user device may perform functions and/or processes described as being performed by the computer system 30, described below in more detail.

Figure 2:
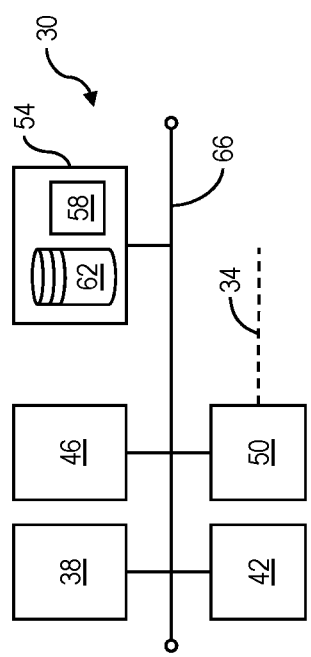
FIG. 2 is a diagram of an exemplary implementation of a computer system shown in FIG. 1 and constructed in accordance with the present disclosure.

Referring now to FIG. 2, shown therein is a diagram of an exemplary embodiment of the computer system 30 constructed in accordance with the present disclosure. In some embodiments, the computer system 30 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the computer system 30 may include one or more input devices 38 (hereinafter "input device 38"), one or more output devices 42 (hereinafter "output device 42"), one or more processors 46 (hereinafter "processor 46"), one or more communication devices 50 (hereinafter "communication device 50") capable of interfacing with the communication network 34, one or more non-transitory processor-readable medium (hereinafter "computer system memory 54") storing processor-executable code and/or software application(s) 58, for example including, a web browser capable of accessing a website and/or communicating information and/or data over a wireless or wired network (e.g., the communication network 34), and/or the like, and a database 62. The input device 38, the output device 42, the processor 46, the communication device 50, and the computer system memory 54 may be connected via a path 66 such as a data bus that permits communication among the components of the computer system 30.

In some implementations, the processor 46 may comprise one or more processor 46 working together, or independently, to read and/or execute processor executable code and/or data, such as stored in the computer system memory 54. The processor 46 may be capable of creating, manipulating, retrieving, altering, and/or storing data structures into the computer system memory 54. Each element of the computer system 30 may be partially or completely network-based or cloud-based, and may or may not be located in a single physical location.

Exemplary implementations of the processor 46 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 46 may be capable of communicating with the computer system memory 54 via the path 66 (e.g., data bus). The processor 46 may be capable of communicating with the input device 38 and/or the output device 42.

The processor 46 may be further capable of interfacing and/or communicating with the network elements 14 via the communication network 34 using the communication device 50. For example, the processor 46 may be capable of communicating via the communication network 34 by exchanging signals (e.g., analog, digital, optical, and/or the like) via one or more ports (e.g., physical or virtual ports) using a network protocol to provide information to the one or more network element 14.

The computer system memory 54 may store a software application 58 that, when executed by the processor 46, causes the computer system 30 to perform an action such as communicate with, or control, one or more component of the computer system 30, the optical transport network 10 (e.g., the one or more network element 14*a-n*), and/or the communication network 34. The software application 58 may be a Service and Power Control Orchestrator 200 (hereinafter, SPCO 200) or one or more service component of the SPCO 200, such as orchestrator 202 as described below in more detail.

In some implementations, the computer system memory 54 may be located in the same physical location as the computer system 30, and/or one or more computer system memory 54 may be located remotely from the computer system 30. For example, the computer system memory 54 may be located remotely from the computer system 30 and communicate with the processor 46 via the communication network 34. Additionally, when more than one computer system memory 54 is used, a first computer system memory may be located in the same physical location as the processor 46, and additional computer system memory may be located in a location physically remote from the processor 46. Additionally, the computer system memory 54 may be implemented as a "cloud" non-transitory processor-readable storage memory (i.e., one or more of the computer system memory 54 may be partially or completely based on or accessed using the communication network 34).

In one implementation, the database 62 may be a time-series database, a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 62 can be centralized or distributed across multiple systems.

The input device 38 may be capable of receiving information input from the user, another computer, and/or the processor 46, and transmitting such information to other components of the computer system 30 and/or the communication network 34. The input device 38 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 42 may be capable of outputting information in a form perceivable by the user, another computer system, and/or the processor 46. For example, implementations of the output device 42 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 38 and the output device 42 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

Figure 3A:
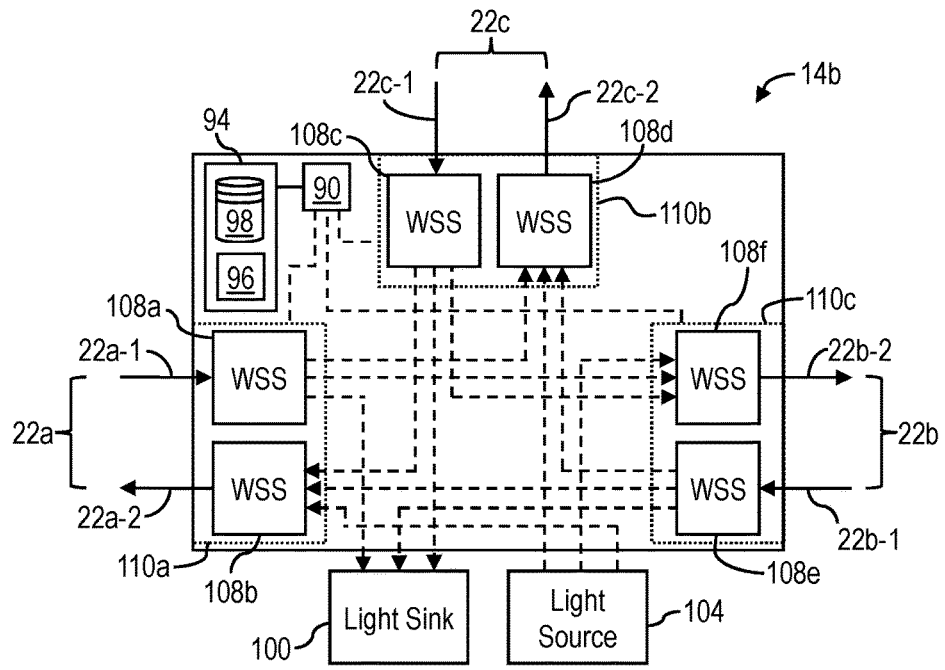
FIG. 3A is a block diagram of an exemplary implementation of a network element being a reconfigurable optical add/drop multiplexer constructed in accordance with the present disclosure.

Referring now to FIG. 3A, shown therein is a block diagram of an exemplary implementation of the network element 14 constructed in accordance with the present disclosure. In general, the network element 14 transmits and receives data traffic and control signals. Nonexclusive examples of alternative implementations of the network element 14 include optical line terminals (OLTs), optical cross connects (OXCs), optical line amplifiers, optical add/drop multiplexer (OADMs) and/or reconfigurable optical add/drop multiplexers (ROADMs), interconnected by way of optical fiber links. OLTs may be used at either end of a connection or optical fiber link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety. For the purposes of illustration, SPCO 200 will be described as deployed on a ROADM. Therefore, as used herein, the network element 14 is implemented as a ROADM unless specifically stated otherwise.

For the purposes of illustration, and not limitation, the second network element 14b will be described as an exemplary network element 14. It should be understood, however, that each network element 14 may be comprised of the same elements. In FIG. 3A, the second network element 14b is illustrated as being a ROADM having three degrees that interconnect the first transmission line segment 22a, the second transmission line segment 22b, and the third transmission line segment 22c. Each of the first transmission line segment 22a, the second transmission line segment 22b, and the third transmission line segment 22c may include optical fiber pairs, wherein each fiber of the pair carries optical signal groups propagating in opposite directions. As seen in FIG. 3A, for example, the first transmission line segment 22a includes a first optical fiber 22a-1, which carries optical signals toward the second network element 14b and a second optical fiber 22a-2 that carries optical signals out from the second network element 14b. Similarly, the second transmission line segment 22b may include a first optical fiber 22b-1 and a second optical fiber 22b-2 carrying optical signal groups to and from the second network element 14b, respectively. Further, the third transmission line segment 22c may include first optical fiber 22c-1 and second optical fiber 22c-2 also carrying optical signals to and from the second network element 14b, respectively. Additional nodes, not shown in FIG. 3A, may be provided that supply optical signal groups to and receive optical signal groups from the second network element 14b. Such nodes may also have a ROADM having the same or similar structure as that of the second network element 14b.

As further shown in FIG. 3A, a light sink 100 (described below in more detail and shown in FIG. 3B) and a light source 104 (described below in more detail and shown in FIG. 3C) may be provided in communication with the second network element 14b to drop and add optical signal groups, respectively.

As shown in FIG. 3A, the second network element 14b may include a plurality of wavelength selective switches (WSSs 108), such as a first wavelength selective switch 108a, a second wavelength selective switch 108b, a third wavelength selective switch 108c, a fourth wavelength selective switch 108d, a fifth wavelength selective switch 108e, and a sixth wavelength selective switch 108f. Wavelength selective switches are components that can dynamically route, block, and/or attenuate received optical signal groups input from and output to transmission line segments 22a-n. In addition to transmitting/receiving optical signal groups from network elements 14, optical signal groups may also be input from or output to the light source 104 and light sink 100, respectively.

In one embodiment, the WSSs 108 for a particular degree, along with associated FRM memory 188 and FRM processor 186 (shown in FIG. 3D), may be collectively referred to as a flexible ROADM module, or FRM 110. For example, as shown in FIG. 3A, a first WSS 108a and a second WSS 108b may be part of a first FRM 110a, a third WSS 108c and a fourth WSS 108d may be part of a second FRM 110b, and a fifth WSS 108e and a sixth WSS 108f may be part of a third FRM 110c.

In one embodiment, each WSS 108a-f may include a reconfigurable optical filter (not shown) operable to allow a passband (e.g., particular bandwidth of the spectrum of the optical signal) to pass through or be directly routed as herein described.

As further shown in FIG. 3A, each WSS 108a-f may be configured to receive optical signal groups (e.g., optical passbands) and may be operable to selectively switch, or direct, such optical signal groups to other WSSs for output from the second network element 14b. For example, the first WSS 108a may receive optical signal groups on the first optical fiber 22a-1 and supply certain optical signal groups to the sixth WSS 108f, while other optical signal groups are supplied to a fourth WSS 108d. Optical signal groups supplied to the sixth WSS 108f may be output to a downstream network element 14, such as the third network element 14c (FIG. 1) on the second optical fiber 22b-2, while optical signal groups supplied to the fourth WSS 108d may be output to the fourth network element 14d on second optical fiber 22c-2. Optical signal groups input to the second network element 14b on the first optical fiber 22b-1 may be supplied by the fifth WSS 108e to either the second WSS 108b and on to the first network element 14a via the second optical fiber 22a-2 or the fourth WSS 108d and on to the fourth network element 14d via the second optical fiber 22c-2. Moreover, the third WSS 108c may selectively direct optical signal groups (e.g., selectively switch optical passband groups) input to the second network element 14b from the first optical fiber 22c-1 to either the second WSS 108b and onto the first network element 14a via the second optical fiber 22a-2 or to the sixth WSS 108f and onto the second network element 14b via the second optical fiber 22b-2.

The first WSS 108a, third WSS 108c, and fifth WSS 108e may also selectively or controllably supply optical signal groups to the light sink 100. Optical signal groups output from the light source 104 may be selectively supplied to one or more of the second WSS 108b, fourth WSS 108d, and sixth WSS 108f, for output on to the second optical fiber 22a-2, second optical fiber 22b-2, and second optical fiber 22c-2, respectively.

In one implementation, the second network element 14b may further comprise a node processor 90 and a non-transitory computer readable medium referred to herein as node memory 94. The node processor 90 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The node processor 90 is in communication with the node memory 94 and may be operable to read and/or write to the node memory 94. The node processor 90 is illustrated in communication with the first FRM 110a, the second FRM 110b, and the third FRM 110c, however, it should be noted that in some implementations, the node processor 90 may be in communication with each WSS 108. The node processor 90 may be further capable of interfacing and/or communicating with other network elements 14 (e.g., the first network element 14a, the third network element 14c, and the fourth network element 14d) via the communication network 34 and/or an optical control channel (e.g., sometimes referred to herein as an optical supervisory channel or an "OSC"). For example, the node processor 90 may be capable of communicating via the communication network 34 by exchanging signals (e.g., analog, digital, optical, and/or the like) via one or more ports (e.g., physical or virtual ports) using a network protocol to provide information to the one or more network element 14.

In one implementation, the node memory 94 of the network element 14, such as of the second network element 14b, may store a software application 96, such as an orchestrator application (e.g., the SPCO 200 or one or more service component of the SPCO 200 such as orchestrator 202, described below in more detail) that, when executed by the node processor 90, causes the node processor 90 to perform an action, for example, communicate with or control one or more component of the network element 14 such as control one or more of the WSS 108 or the FRM 110.

In one implementation, the node memory 94 may store one or more of the datastore 98. The datastore 98 may include, for example, structured data from relational databases, semi-structured data, unstructured data, time-series data, binary data, and the like and/or some combination thereof. The datastore 98 may be a data base, a remote accessible storage, or a distributed filesystem. In some embodiments, the datastore 98 may be a component of an enterprise network.

Figure 3B:
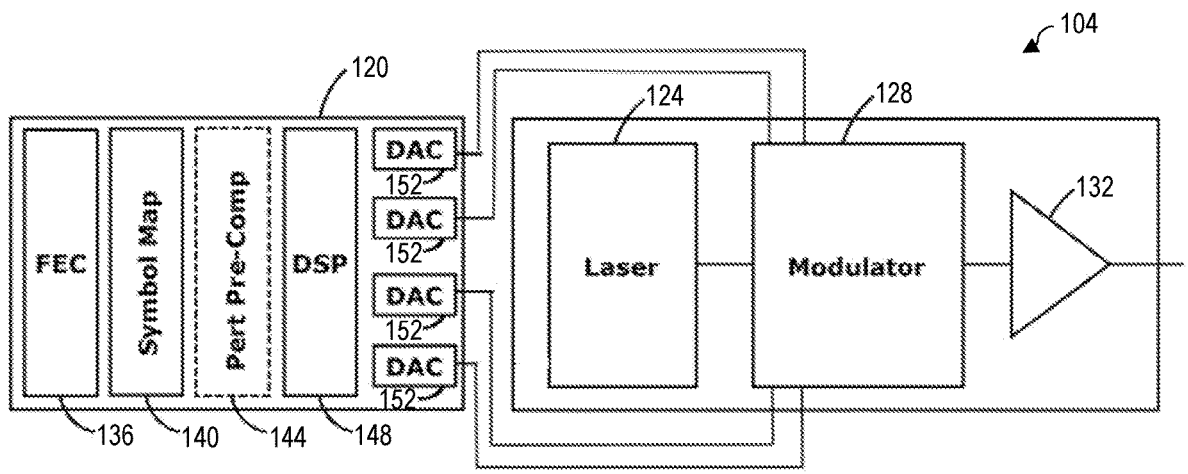
FIG. 3B is a diagram of an exemplary implementation of a light source of FIG. 3A constructed in accordance with the present disclosure.

Referring now to FIG. 3B, shown therein is a diagram of an exemplary implementation of the light source 104 of FIG. 3A constructed in accordance with the present disclosure. The light source 104 may comprise one or more transmitter processor circuit 120, one or more laser 124, one or more modulator 128, one or more semiconductor optical amplifier 132, and/or other components (not shown).

The transmitter processor circuit 120 may have a Transmitter Forward Error Correction (FEC) circuitry 136, a Symbol Map circuitry 140, a transmitter perturbative pre-compensation circuitry 144, one or more transmitter digital signal processor (DSP) 148, and one or more digital-to-analogue converters (DAC) 152. The transmitter processor circuit 120 may be located in any one or more components of the light source 104, or separate from the components, and/or in any location(s) among the components. The transmitter processor circuit 120 may be in the form of one or more Application Specific Integrated Circuit (ASIC), which may contain one or more module and/or custom module.

Processed electrical outputs from the transmitter processor circuit 120 may be supplied to the modulator 128 for encoding data into optical signals generated and supplied to the modulator 128 from the laser 124. The semiconductor optical amplifier 132 receives, amplifies, and transmits the optical signal including encoded data in the spectrum. Processed electrical outputs from the transmitter processor circuit 120 may be supplied to other circuitry in the transmitter processor circuit 120, for example, clock and data modification circuitry. The laser 124, modulator 128, and/or semiconductor optical amplifier 132 may be coupled with a tuning element (e.g., a heater) (not shown) that can be used to tune the wavelength of an optical signal channel output by the laser 124, modulator 128, or semiconductor optical amplifier 132. In some implementations, a single one of the laser 124 may be shared by multiple light source 104.

Other possible components in the light source 104 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein.

Figure 3C:
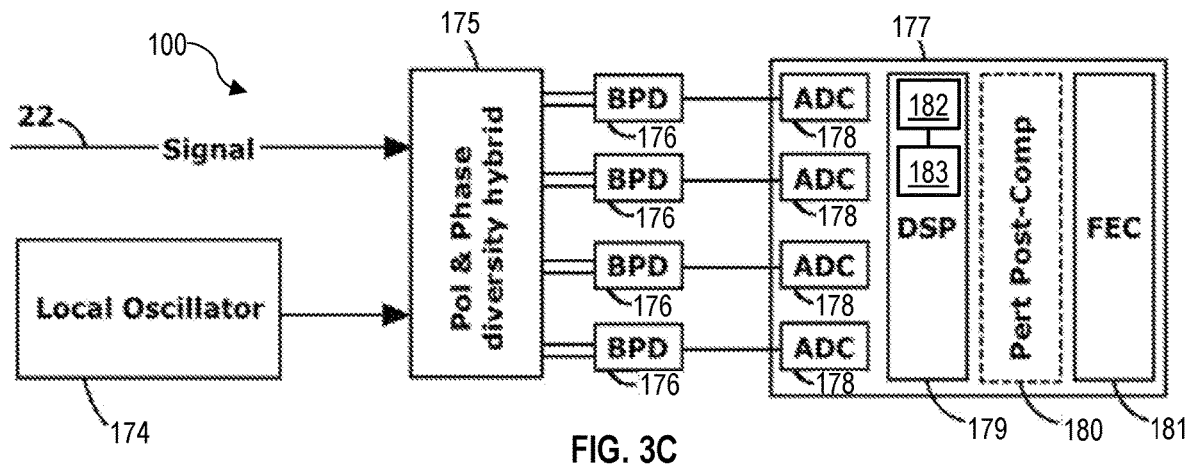
FIG. 3C is a block diagram of an exemplary implementation of a light sink constructed in accordance with the present disclosure.

Referring now to FIG. 3C, shown therein is a block diagram of an exemplary implementation of the light sink 100 constructed in accordance with the present disclosure. The light sink 100 may comprise one or more local oscillator 174, a polarization and phase diversity hybrid circuit 175 receiving the one or more channel from the optical signal and the input from the local oscillator 174, one or more balanced photodiode (BPD) 176 that produces electrical signals representative of the one or more channel on the spectrum, and one or more receiver processor circuit 177. Other possible components in the light sink 100 may include filters, circuit blocks, memory, such as non-transitory processor-readable memory storing processor-executable instructions, additional modulators, splitters, couplers, multiplexers, etc., as is well known in the art. The components may be combined, used, or not used, in multiple combinations or orders. The light sink 100 may be implemented in other ways, as is well known in the art. Exemplary implementations of the light sink 100 are further described in U.S. patent application Ser. No. 12/052,541, titled "Coherent Optical Receiver", the entire contents of which are hereby incorporated by reference.

The one or more receiver processor circuit 177, may comprise one or more analog-to-digital converter (ADC) 178 receiving electrical signals from the one or more balanced photodiodes 176, one or more receiver digital signal processor (hereinafter, receiver DSP 179), receiver perturbative post-compensation circuitry 180, and receiver forward error correction circuitry (hereinafter, receiver FEC circuitry 181). The receiver FEC circuitry 181 may apply corrections to the data, as is known in the art. The one or more receiver processor circuit 177 and/or the one or more receiver DSP 179 may be located on one or more component of the light sink 100 or separately from the components, and/or in any location(s) among the components. The receiver processor circuit 177 may be in the form of an Application Specific Integrated Circuit (ASIC), which may contain one or more module and/or custom module. In one embodiment, the receiver DSP 179 may include, or be in communication with, one or more processor 182 and one or more memory 183 storing processor readable instructions, such as software, or may be in communication with the node processor 90 and the node memory 94.

The one or more receiver DSP 179 may receive and process the electrical signals with multi-input-multiple-output (MIMO) circuitry, as described, for example, in U.S. Pat. No. 8,014,686, titled "Polarization demultiplexing optical receiver using polarization oversampling and electronic polarization tracking", the entire contents of which are hereby incorporated by reference herein. Processed electrical outputs from receiver DSP 179 may be supplied to other circuitry in the receiver processor circuit 177, such as the receiver perturbative post-compensation circuitry 180 and the receiver FEC circuitry 181.

Various components of the light sink 100 may be provided or integrated, in one example, on a common substrate. Further integration is achieved by incorporating various optical demultiplexer designs that are relatively compact and conserve space on the surface of the substrate.

In use, the one or more channel of the spectrum may be subjected to optical nonlinear effects between the light source 104 and the light sink 100 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 171 and the receiver perturbative post-compensation circuitry 180. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler", herein incorporated by reference in its entirety, by use of analysis of one or more incoming channel at the light sink 100.

Figure 3D:
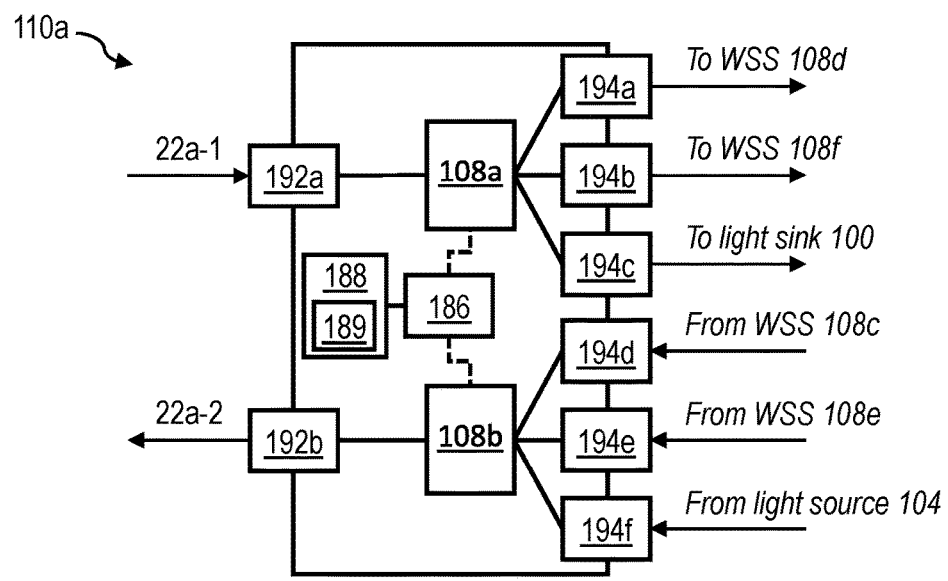
FIG. 3D is a diagram of an exemplary implementation of a flexible ROADM module (FRM) constructed in accordance with the present disclosure.

Referring now to FIG. 3D, shown therein is a diagram of an exemplary implementation of an FRM 110 constructed in accordance with the present disclosure. For the purposes of illustration, and not by way of limitation, the first FRM 110a will be described herein. The first FRM 110*a* generally comprises an FRM processor 186 in communication with an FRM memory 188, the first WSS 108*a*, and the second WSS 108*b*. The FRM memory 188 may store one or more FRM application 189. For instance, in some embodiments, one instance of an FRM application 189 may be an orchestrator application (e.g., the SPCO 200 or one or more service component of the SPCO 200 such as orchestrator 202, described below in more detail) that, when executed by the FRM processor 186, causes the FRM processor 186 to perform an action, for example, communicate with or control one or more component of the FRM 110 such as control one or more of the WSS 108*a* and/or WSS 108*b*.

The first WSS 108*a* is shown in optical communication with a first line port 192*a* and may be operable to receive an optical signal from an optical fiber such as the first optical fiber 22*a*-1. The first WSS 108*a* may further be in optical communication with two or more system ports 194 (shown in FIG. 3D as a first system port 194*a*, a second system port 194*b*, and a third system port 194*c*) to selectively output one or more passband to one or more of WSS 108*d*, WSS 108*f*, and the light sink 100 through one or more of the system ports 194.

The second WSS 108*b* is shown in optical communication with a second line port 192*b* and may be operable to output an optical signal to an optical fiber such as the optical fibers 22*a*-*b*. The second WSS 108*b* may further be in optical communication with two or more system ports 194 (shown in FIG. 3D as fourth system port 194*d*, fifth system port 194*e*, and sixth system port 194*f*) to selectively receive input from one or more of WSS 108*c*, WSS 108*e*, and the light source 104 and output one or more passband to the second line port 192*b*.

In one embodiment, the first WSS 108*a* may be a DEMUX WSS and the second WSS 108*b* may be a MUX WSS. The number of components illustrated in FIG. 3D is provided for explanatory purposed. In practice, there may be additional components, such as one or more EDFA, fewer components, different components, and/or differently arranged components than shown in FIG. 3D.

In one implementation, each of the system ports 194*a*-*n* may be provided with a port type (e.g., an express port or an add/drop port). For example, the first system port 194*a* may be optically coupled to the fourth WSS 108*d*, and the second system port 194*b* may be optically coupled to the sixth WSS 108*f*, and each of the first system port 194*a* and the second system port 194*b* may have a port type of express port that optically route wavelengths from one transmission line segment to another (e.g., from the first transmission line segment 22*a* to the third transmission line segment 22*c* by optically routing wavelengths from the first WSS 108*a* through the first system port 194*a* to the fourth WSS 108*d* which routes the wavelengths on to the third transmission line segment 22*c*). In the illustrated implementation, the third system port 194*c* is optically coupled to the light sink 100 and may have a port type of add/drop port and may be considered a drop port. Similarly, the fourth system port 194*d*, optically coupled to the third WSS 108*c*, and the fifth system port 194*e*, optically coupled to the fifth WSS 108*e*, may have a port type of express port and may be considered express ports, while the sixth system port 194*f*, optically coupled to the light source 104, may have a port type of add/drop port and may be considered an add port.

In one implementation, the first FRM 110*a* is a C-Band FRM, that is, the components of the first FRM 110*a* operate on the C-Band of the optical spectrum. In other implementations, the first FRM 110*a* may be an L-Band FRM, that is, the components of the first FRM 110*a* operate on the L-Band of the optical spectrum. In yet another implementation, the first FRM 110*a* may be a C+L-Band FRM having components that operate on the C-Band and the L-Band. The number of devices illustrated in FIG. 3D is provided for explanatory purposes. In practice, there may be additional devices, fewer devices, different devices, or differently arranged devices than are shown in FIG. 3D. Furthermore, two or more of the devices illustrated in FIG. 3D may be implemented within a single device, or a single device illustrated in FIG. 3D may be implemented as multiple, distributed devices. For example, the C+L-Band FRM may comprise an L-Band FRM optically coupled to a C-Band FRM.

In one implementation, the FRM memory 188 may be constructed in accordance with the computer system memory 54 and/or the node memory 94 as described above in more detail. The FRM memory 188 may comprise a non-transitory processor-readable medium storing processor-executable instructions such as the FRM application 189. The FRM application 189 includes instructions that, when executed by the FRM processor 186, cause the FRM processor 186 to control the first WSS 108*a* and/or the second WSS 108*b*.

In a first aspect, an incoming optical signal having multiple optical channels enters the first line port 192*a* via the first optical fiber 22*a*-1 and is directed to the first WSS 108*a*. The incoming optical signal is split into one or more segments by the first WSS 108*a*, each segment having one or more optical channel. The one or more segments of the incoming optical signal are then directed to one or more system port 194*a*-*c*, for example, the first WSS 108*a* may direct one or more segment to one or more of the fourth WSS 108*d* via the first system port 194*a*, the sixth WSS 108*f* via the second system port 194*b*, and/or the light sink 100 via the third system port 194*c*.

In a second aspect, a first incoming optical signal enters the fourth system port 194*d*, a second incoming optical signal enters the fifth system port 194*e*, and a third incoming optical signal enters the sixth system port 194*f* and each incoming optical signal is directed to the second WSS 108*b*. The second WSS 108*b*, as directed by the FRM processor 186, may combine the first incoming optical signal, the second incoming optical signal, and the third incoming optical signal into a combined optical signal that is sent on the second optical fiber 22*a*-2 via the second line port 192*b*. For example, the second WSS 180*b* may receive the first incoming optical signal from the third WSS 108*c* via the fourth system port 194*d*, the second incoming optical signal from the fifth WSS 108*e* via the fifth system port 194*e*, and the third incoming optical signal from the light source 104 via the sixth system port 194*f*.

While each of the above aspects and the illustration of the first WSS 108*a* and the second WSS 108*b* in FIG. 3D show the first WSS 108*a* and the second WSS 108*b* with only three of the system ports 194, a person having ordinary skill in the art would recognize that the first WSS 108*a* and the second WSS 108*b* may have as few as two system ports 194 and as may system ports 194 as the WSS 108 is operable to selectively output or combine. In some embodiments, each WSS 108 may have any number of system ports 194 in a range from 2 to 16 system ports 194.

Figure 4:
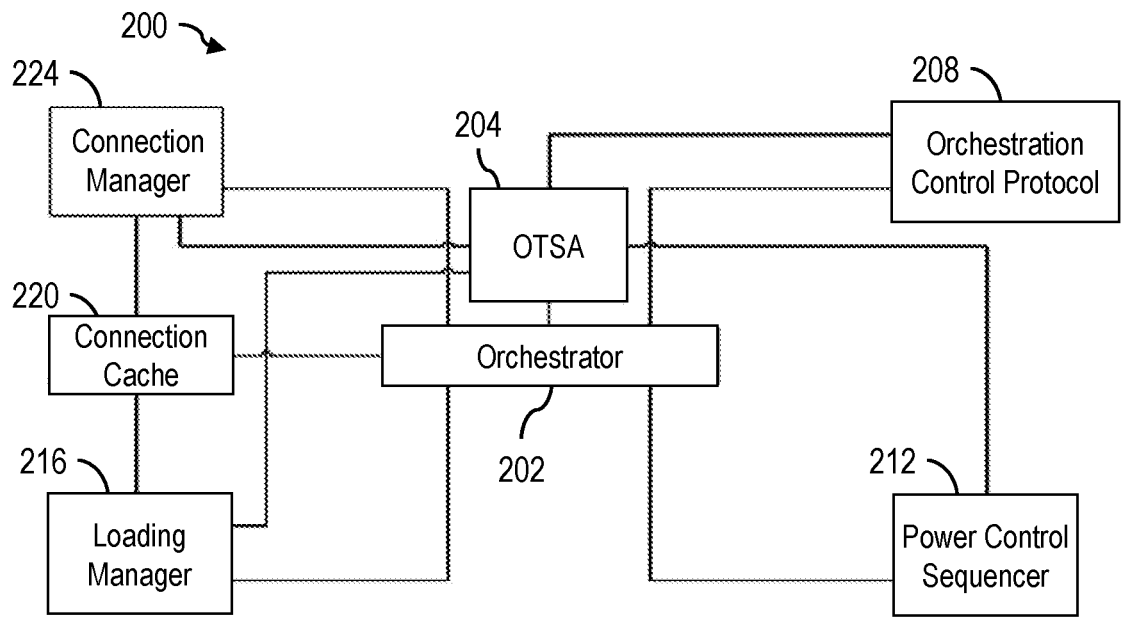
FIG. 4 is a software architecture diagram of an exemplary implementation of a Service and Power Control Orchestrator constructed in accordance with the present disclosure.

Referring now to FIG. 4, shown therein is a software architecture diagram of an exemplary implementation of a Service and Power Control Orchestrator 200 (hereinafter, SPCO 200) constructed in accordance with the present disclosure. As previously described, the SPCO 200 and/or one or more service component of the SPCO 200 may be, or be part of, the software application 58 stored on the computer system memory 54 of the computer system 30 (FIG. 2); and/or the SPCO 200 and/or one or more service component of the SPCO 200 may be, or be part of, the software application 96 stored on the node memory 94 of the network element(s) 14 (FIG. 3A); and/or the SPCO 200 and/or one or more service component of the SPCO 200 may be, or be part of, the FRM application 189 stored on the FRM memory 188 of the FRM(s) 110 (FIG. 3D).

Generally, the SPCO 200 comprises, or interfaces with, one or more service components such as an orchestrator 202, an optical topology and switching abstraction component 204 (hereinafter, OTSA 204), an orchestration control protocol 208 (hereinafter, OCP 208), a power control sequencer 212 (hereinafter, PCS 212), a loading manager 216, a connection cache 220, and a connection manager 224. While the aforementioned service components are shown in FIG. 4, the SPCO 200 may interface with additional service components not shown. Generally, the SPCO 200 is a software component operable to sequence the optical power control functions such that an optical service is turned-up (activated) or turned-down (deactivated) while managing a number of transients being introduced on the optical signal of a C+L band network domain. In other words, the SPCO 200 may generate one or more service loading sequence. The service loading sequence may be the sequence that the optical service is activated or deactivated. In one embodiment, the SPCO 200 determines when a specific optical power control loop function (e.g., a ROADM MUX control loop) should be executed and in what sequence (e.g., as a workflow).

In one implementation, when a state change (e.g., a controlled action (e.g., adding and/or removing wavelengths), or an uncontrolled action (e.g., change in fiber span loss, unexpected equipment failure)) on a transmission line segment such as the first transmission line segment 22a occurs, an SPCO 200 on a network element such as the SPCO 200a on the first network element 14a may be configured to send a signal to each downstream network element that carries express traffic originating from the first network element 14a (e.g., the second network element 14b), the signal configured to cause the SPCO 200b of the second network element 14b to determine and store a power set point value for each active passband for the express traffic during a normal gain control cycle. These power set point values may be referred to as a last known-good operating condition or a last valid control information for each respective passband. After the state change is successfully run on the first transmission line segment 22a, the SPCO 200a of the first network element 14a sends a second signal to the downstream network element 14b configured to cause the SPCO 200b to re-adjust all dependent passbands using the stored power set point values. The re-adjustment corrects for any power excursions propagating downstream from the segment-under-change's (i.e., the first transmission line segment 22a) egress, and returns the downstream segment(s) (i.e., the second transmission line segment 22b) to the last known good operating point. In some implementations, the above sequence may be referred to as a ForceAdjust sequence or ForceAdjust method.

When the state change includes a service loading sequence or multiple operations that are required to be run sequentially (e.g., when optical line system control software is performing loading management and decomposing a larger set of operation requests into multiple smaller subsets), the SPCO 200 may be configured to run the Force-Adjust sequence described above after each step in the sequence or between each operation to correct for any power excursions propagating downstream from the segment-under-change's egress, and returns the downstream segments to the last known good operating point. If the ForceAdjust sequence is successful, then a full AGC cycle does not need to be run on the downstream segments thus solving a significant problem that currently exists in the art.

It should be noted that certain functions described herein as being performed by the SPCO 200 may be performed by one or more of the service components performing the functions described herein. For instance, the orchestrator 202 and/or the OCP 208 may be used to determine and store the power set point value for each active passband for the express traffic. The orchestrator 202 and/or the PCS 212 may be used to re-adjust all dependent passbands using the stored power set point values. The orchestrator 202 and/or the PCS 212 may be used to determine sequencing of local power control functions and link level optical power control functions. These examples are provided for illustration purposes only and should not be considered limiting.

In one implementation, the SPCO 200 is responsible for sequencing of local power control functions and link level optical power control functions on a particular one of the network element 14 into a power control operation sequence (PCO sequence) such that power control operations are executed in a correct sequence. Generally, sequencing of local power control functions and link level optical power control functions may be delegated to one or more service component, such as the PCS 212.

In one implementation, the SPCO 200 is responsible for network-wide service activation and deactivation, band activation and deactivation, and segment activation and deactivation such that the risk of transients and/or SRS tilt in the optical signal is mitigated. Generally, network-wide activation and deactivation, band activation and deactivation, and segment activation and deactivation functions may be delegated to one or more service component, such as the PCS 212 or the OCP 208.

In one implementation, the SPCO 200 is responsible for passband fault handling including signaling of passband level fault indications to dependent downstream segments such that corresponding DEMUX SPCO and MUX SPCO deactivate affected passbands, e.g., passbands experiencing one or more passband fault.

In one implementation, the SPCO 200 is responsible for automation of controlled operations functions such as Card Locks and Cold Resets. Card locks and cold resets should only be carried out after deactivation of services configured on that particular network element or component such that other services sharing a particular one of the optical fiber link 22 with the deactivated service(s) do not experience transients.

In one implementation, the SPCO 200 is responsible for automation of fault recovery functions such that, on recovery of the fault, services impacted by the fault are re-activated without causing transients on any part of the optical transport network 10.

In one implementation, the orchestrator 202 is implemented as software. The orchestrator 202 coordinates with each of the service components of the SPCO 200. The orchestrator 202, by coordinating with each service component, achieves optical service turn-up/turn-down through orchestration of power control functions. In one implementation, the orchestrator 202 tracks passband level finite state machines (FSMs) to pick an appropriate workflow to be executed. As used herein, the workflow is a set of one or more tasks executed by the SPCO 200 to load one or more optical service, e.g., to perform one or more loading operation such as activation or deactivation of optical services. Additionally, passband level FSMs may include passband level states such as up or down status (e.g., is the passband activated or deactivated), shutdown status, active status and fault status and/or the like. In one implementation, the orchestrator 202 is operable to interface between one or more requestor (entity requesting an optical service activation and/or deactivation) and actual optical service activation and/or deactivation on a C+L band network domain.

In one implementation, the orchestrator 202 serves as a central point with respect to all decisions within the SPCO 200. For example, the orchestrator 202 may determine when to issue a loading request to a control block or a PCO request (i.e., a power control operation request) to a downstream ROADM, or to signal a passband's loading state in the OCP 208. In one implementation, the orchestrator 202 may delegate orchestration functionality to one or more service component as described below. For example, optimizing passband batches may be delegated to the loading manager 216 and PCO requests, service loading request, and/or passband loading requests may be delegated to the PCS 212. Additionally, in some implementations, the orchestrator 202 may delegate inter-node communications to the OCP 208, topology related configuration details are provided by the OTSA 204, and connection related details are provided by the connection manager 224.

In one implementation, the OTSA 204 may be an optical topology and switching abstraction model. The OTSA 204 may be a logical ROADM model or a logical FRM model, for example. The OTSA 204 may serve as a central repository of logical ROADM model.

In one implementation, the OTSA 204 may be implemented in software and provide an application programming interface (API) operable to receive a request for the logical ROADM model and provide at least a portion of the logical ROADM model to the requestor.

In one implementation, the OTSA 204 may be implemented in software and provide a subscription service operable to receive a subscription request from a particular service component, and, when the logical ROADM model is updated, the OTSA 204 may notify the particular service component of the change.

In one implementation, the OCP 208 may be implemented in software and manages network level coordination of power control functions. Generally, the OCP 208 may perform one or more of the following: neighbor adjacency management; handle requests from the orchestrator 202 for service activation or service deactivation on one or more local one of the WSS 108; handle a neighbor's request for service activation or service deactivation on one or more local one of the WSS 108; handle passband state notifications; periodically refresh passband activation states; synchronize local and neighbor node restarts; and aid in recovery of neighbor node after a communication failure/restart.

In one implementation, the OCP 208 may be implemented as described in the U.S. Patent Application No. 63/305,758 entitled "Orchestration Control Protocol", filed on Feb. 2, 2022, the entire contents of which are hereby incorporated herein in their entirety.

In one implementation, the PCS 212 may be implemented in software and is operable to sequence optical power control operations. When the orchestrator 202 requests that the PCS 212 perform a power control operation request (PCO request), the PCS 212 generates an ordered list of power control operations to be carried out. In some embodiments, the PCS 212 further executes the ordered list of power control operations. In one embodiment, the PCS 212 utilizes one or more platform-specific component Power Control Agent (PCA) to execute the ordered list of power control operations. In one embodiment, the PCS 212 may further consolidate and report the state of each control block 404 (described below). In one implementation, the PCS 212 may interface with one or more WSS MUX Control (MCL) power control block, WSS DEMUX Control (DMCL) power control block; and/or link level optical power control block. In one implementation, a PCA may be a C-Band PCA or an L-Band PCA. The C-Band PCA may provide a composite view of a MUX control block 404*a* (FIG. 9), a DEMUX control block 404*b* (FIG. 9), and a link level optical power control block while the L-Band PCA may provide a composite view of just the MUX control block 404*a* and the DEMUX control block 404*b*. In one implementation, each PCA may abstract power control modules and provide a generic interface operable to receive one or more communication from the SPCO 200.

In one implementation, the PCS 212 fetches and stores control block information for one or more control block 404 from the OTSA 204. The PCS 212 may determine which PCO should be executed on which control block 404 based on the PCO request from the orchestrator 202. In one implementation, the PCS 212 may generate a dependency graph for each PCO request by decomposing the PCO request into one or more PCO. The dependency graph may represent a dependency relationship among the PCOs in the PCO request and therefore may determine a sequencing or execution order of the PCOs in the PCO request.

In one implementation, the PCA may be a software component hosted on each line card (e.g., FRM 110) and act as an interface between the PCS 212 and the one or more control blocks 404. The PCS 212 may communicate with each PCA via a unique namespace identifying that PCA. In one implementation, the PCS 212 utilizes a dedicated thread pool to delegate the execution of PCOs to appropriate PCAs. Because the orchestrator 202 of the SPCO 200 communicates with the PCA via the PCS 212, the orchestrator 202 and the SPCO 200 may be considered location independent, that is, the SPCO 200 and the orchestrator 202 may be deployed at one or more of the line card level (i.e., on an FRM 110) or on a controller card in a network element 14 (e.g., on the node memory 94 accessible by the node processor 90).

In one implementation, the PCA may provide an aggregated view of one or more control block 404 and provides access to the control blocks 404 to perform power control operations (PCOs) and to retrieve a control status (as described below). In one implementation, asynchronous updates from control blocks 404 may be channeled via the PCA, through the PCS 212 to the orchestrator 202. The PCA may aggregate one or more control status into one report and transmit that report to the orchestrator 202 as herein described.

In one implementation, the loading manager 216 may be implemented in software and may be operable to manage loading operations (such as service activation and/or service deactivation) on a degree-based loading policy. In some implementations, the degree-based loading policy may be predefined, however, in other embodiments, the degree-based loading policy may be user provisioned.

In one implementation, the loading manager 216 may be implemented as described in the U.S. patent application Ser. No. 18/146,684 entitled "Grouping of Optical Passbands for Loading in an Optical Transmission Spectrum Using an Affinity Identifier", filed on Dec. 27, 2022 or in the U.S. patent application Ser. No. 18/146,654 entitled "User Configurable Spectral Loading in an Optical Line System using Policies and Parameters", filed on Dec. 27, 2022, the entire contents of both of which are hereby incorporated herein in their entirety.

In one implementation, the orchestrator 202 may send one or more request to the loading manager 216 to cause the loading manager 216 to apply the loading policy on one or more passband to be activated and/or deactivated on a particular degree. The loading manager 216 may further generate one or more batch of passbands to be activated and/or deactivated. In one implementation, the one or more batch is an ordered sub-set of the one or more passband to be activated and/or deactivated on the particular degree.

In one implementation, the connection cache 220 may be implemented in software and may be operable to provide a cache API. The cache API may be operable to receive a request querying connection information and in response to the query, provide one or more information of the connection information. The connection information may be a single source of "truth" for service components. The connection cache 220 may store the activation state of the passbands and, thus, associated connections. The cache API may be queried from one or more perspective, such as, for example, a service perspective, a passband perspective, and/or a carrier perspective.

In one implementation, the connection manager 224 may be implemented in software and is operable to manage provisioning of one or more optical service within the SPCO 200. In some embodiments, the connection manager 224 manages provisioning of all optical services within the SPCO 200. In one implementation, each optical service may be either a manual optical connection or a signaled optical circuit through the Generalized Multiprotocol Label Switching (GMPLS) layer.

In one implementation, the connection manager 224 may send one or more signal to the connection cache 220 operable to update connection information stored in and/or by the connection cache 220. In one implementation, the connection manager 224 may send one or more signal to the orchestrator 202 indicative of one or more connection operation being (or to be) carried out. When the orchestrator 202 receives the signal, the orchestrator 202 may load passband information pertaining to the one or more connection operation and operate on the passband information, e.g., transmit the passband information to one or more service component such as the loading manager 216. In one implementation, the connection manager 224 may consolidate one or more state, such as an Activation State, at the connection level.

In one implementation, the SPCO 200 and one or more service component of the SPCO 200 may be implemented as software and stored on a non-transitory processor-readable medium, such as one or more of the computer system memory 54, the node memory 94, and/or the FRM memory 188. The software may be one or more of the software application 58 of the computer system 30, the software application 96 of the network element(s) 14, and/or the FRM application 189. In one embodiment, the SPCO 200 may be implemented on a shelf controller or node controller such as on the computer system memory 54 and executed by the processor 46 of the computer system 30, may be implemented on the network element 14 (e.g., a ROADM) such as on the node memory 94 and executed by the node processor 90, and/or implemented on an FRM 110 such as on the FRM memory 188 and executed by the FRM processor 186.

In one implementation, when the SPCO 200 is implemented on the FRM 110, e.g., the third FRM 110c, for example, the service components of the SPCO 200 may have one or more defined interactions. For example, the connection manager 224 and the OTSA 204 may interact with an SPCO agent of a management layer (described below in reference to FIG. 7); the OTSA 204 may interact with a neighbor detection protocol executing on the base card; the OCP 208 may interact with a neighbor message handler; and the PCS 212 may interact with the power control agent on either the base or an expansion card (as described below in more detail).

In one implementation, the neighbor discovery protocol, which performs neighbor associate, may be constructed as described in the U.S. patent application Ser. No. 18/152,440 entitled "Systems and Methods for Network Element Neighbor Discovery", filed on Jan. 10, 2022, the entire contents of which are hereby incorporated herein in their entirety. In one implementation, the neighbor message handler is a platform-specific software component operable to exchange messages with adjacent ROADMs (as described below in reference to FIG. 7).

Figure 5:
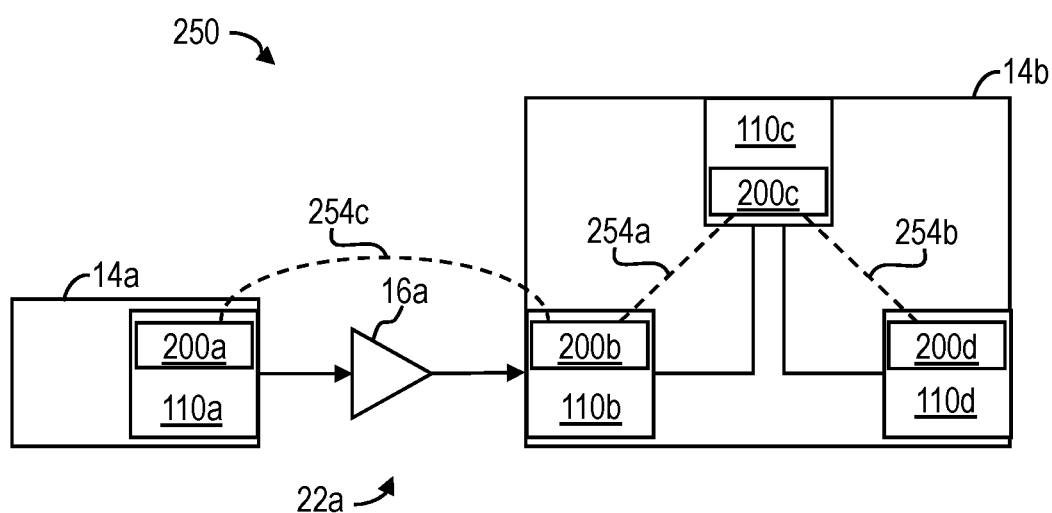
FIG. 5 is a diagram of an exemplary implementation of an adjacency graph of a second network element of FIG. 1 constructed in accordance with the present disclosure.

In one implementation, when the SPCO 200 is deployed on all degrees of a ROADM, e.g., all FRM 110 of a network element 14, the SPCO 200 forms adjacency with neighboring SPCO 200 instances, e.g., a deployed instance of the SPCO 200 on other degrees of a same one of the network element 14 and/or with one or more SPCO 200 deployed on a neighboring network element 14. Referring now to FIG. 5, shown therein is a diagram of an exemplary embodiment of an adjacency graph 250 of the second network element 14b constructed in accordance with the present disclosure.

As shown in FIG. 5, the second network element 14b is optically coupled to the first network element 14a via the first transmission line segment 22a. The first network element 14a is provided with a first SPCO 200a deployed on the first FRM 110a. The second network element 14b is provided with a second SPCO 200b deployed on the second FRM 110b, a third SPCO 200c deployed on the third FRM 110c, and a fourth SPCO 200d deployed on the fourth FRM 110d. Further shown in FIG. 5 is the first in-line amplifier 16a optically disposed in the first transmission line segment 22a intermediate the first network element 14a and the second network element 14b. The first in-line amplifier 16a may be, for example, one or more of an in-line optical amplifier, a variable optical attenuator (VOA), an erbium-doped fiber amplifier (EDFA), and/or the like.

In one implementation, the second SPCO 200b, deployed on the second FRM 110b forms a neighbor association with neighboring SPCO 200 instances. As shown in FIG. 5, the second SPCO 200b forms a first neighbor association 254a with the third SPCO 200c deployed on the third FRM 110c and a second neighbor association 254b with the fourth SPCO 200d deployed on the fourth FRM 110d. Each of the first neighbor association 254a and the second neighbor association 254b may be considered an intra-node neighbor association because each of the associated FRM 110 (e.g., the third FRM 110c and the fourth FRM 110d) are components of the same node as the second FRM 110b, i.e., the second network element 14b. The second SPCO 200b may further form a third neighbor association 254c with the first SPCO 200a deployed on the first FRM 110a of the first network element 14a. The third neighbor association 254c may be considered an inter-node (or inter-degree) neighbor association because the associated FRM 110 (e.g., the first FRM 110a) is a component of a different node from the second FRM 110b, i.e., the first FRM 110a is on the first network element 14a while the second FRM 110b is on the second network element 14b. It should be noted that while the third neighbor association 254c is shown between the second SPCO 200b on the second FRM 110b and the first SPCO 200a on the first FRM 110a, the third neighbor association 254c may be between the second SPCO 200b on the second FRM 110b and an SPCO 200 deployed on a downstream ROADM from the second FRM 110b, such as on the node memory 94 of the first network element 14a and/or on the or the computer system memory 54 associated with the computer system 30.

As described above, the SPCO 200 and one or more service component of the SPCO 200 may be implemented as software and deployed at any level of the optical transport network 10, e.g., deployed on a chassis or site level in the computer system memory 54, deployed at the node level in the node memory 94, and/or deployed at the FRM or line card level in the FRM memory 188. In order for the SPCO 200 to operate and function at each level without requiring the SPCO 200 to be recompiled for each specific level, functions at each level are abstracted to maintain consistent behavior of the SPCO 200. In this way, the SPCO 200 and all service components of the SPCO 200 use a generic optical topology and switching abstraction to carry out functions, thereby enabling the SPCO 200 to be reusable across different levels and platforms. Because a physical realization of the abstract topology is necessary, i.e., services are actually activated and/or deactivated, mapping between components of the abstract topology and the physical counterparts is established as well.

In this way, communication between distributed deployments of the SPCO 200a-d across multiple network elements 14 in the optical transport network 10 and within each network element 14 across each degree achieves network level orchestration. By deploying the SPCO 200 on each network element 14, dedicated orchestration hardware external to the network element 14 is not needed and may be omitted. Additionally, if a particular SPCO 200 were to fail, orchestration functionality may be maintained by adjacent SPCO 200 instances. In some implementations, within a degree level deployment (e.g., the SPCO 200 being deployed on a particular FRM 110), orchestration functions and associated optical power control blocks are co-located on the same FRM processor 186 thereby providing faster and more reliable local interactions (e.g., interactions between the SPCO 200 and one or more component of the FRM 110). Moreover, fault monitoring, detection, handling, and recovery processes can be sped up as these processes are localized.

Figure 6A:
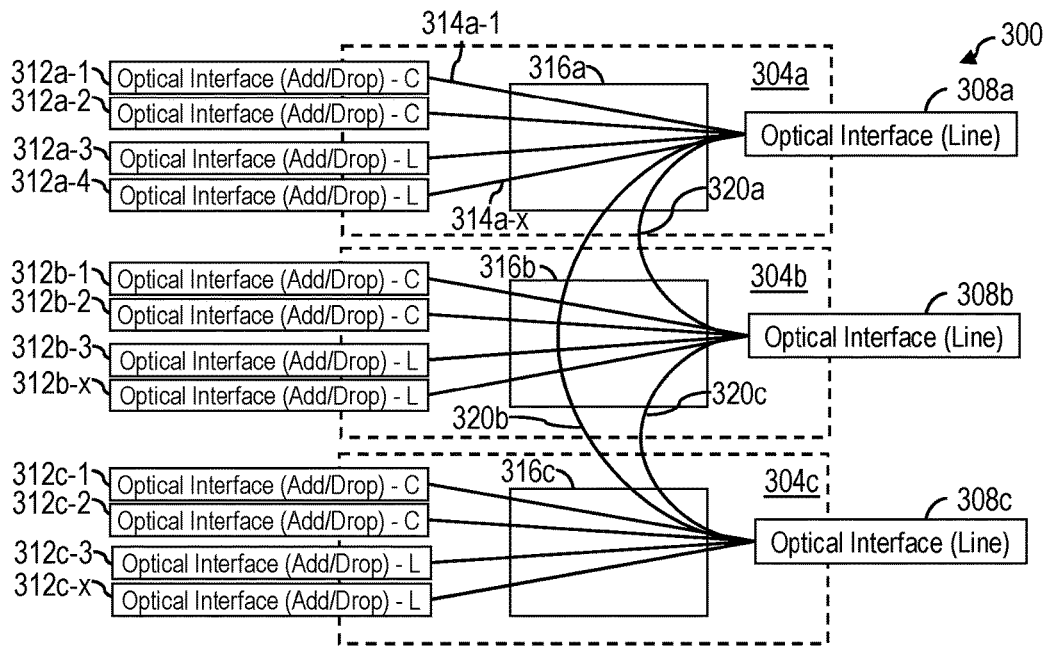
FIG. 6A is a functional diagram of an exemplary implementation of a logical ROADM model constructed in accordance with the present disclosure.

Referring now to FIG. 6A, shown therein is a functional diagram of an exemplary implementation of a logical ROADM model 300 constructed in accordance with the present disclosure. The logical ROADM model 300 shown in FIG. 6A is a logical representation of an 'n'-degree ROADM described below in more detail in FIG. 6B and is described as a three-degree ROADM for brevity and simplicity. As shown, the logical ROADM model 300 generally comprises one or more logical FRM model 304a-n (illustrated as a first logical FRM model 304a, a second logical FRM model 304b, and a third logical FRM model 304c). Each logical FRM model 304 generally comprises a logical line port 308 logically linked to one or more logical system port via a connectivity matrix 316.

As shown in FIG. 6A, the first logical FRM model 304a comprises a first logical line port 308a logically coupled via logical connections 314a-1 through 314a-x (e.g., add/drop connection) to a plurality of system ports 312a-1 through 312a-x via a first connectivity matrix 316a; the second logical FRM model 304b comprises a second logical line port 308b logically coupled to a plurality of system ports 312b-1 through 312b-x via a second connectivity matrix 316b; and the third logical FRM model 304c comprises a third logical line port 308c logically coupled to a plurality of system ports 312c-1 through 312c-x via a third connectivity matrix 316c.

The logical ROADM model 300 represents an Optical Switching Framework (OSF) in which switching is defined between a pair of interfaces, such as a line port and one or more system port. As discussed above, each ROADM consists of one or more degrees/FRMs and each degree/FRM consists of a group of optical interfaces, such as a line port and one or more system port. A connectivity between each optical interface (e.g., the logical line ports 308 and the logical system ports 312) is defined in the connectivity matrix 316.

In one implementation, as discussed above, each system port 194 has a port type of either add/drop port or express port. When a particular system port 194 has a port type of add/drop port, the particular system port 194 interfaces directly with client signals. The client signals may be either connected directly to the line port or multiplexed in one or more stages into an optical signal supplied to the line port. The optical interface model of the logical system ports 312 of the particular system port 194 subsumes the multiplexing hierarchy associated with the client signals entering the ROADM.

In one implementation, when a particular system port 194 has a port type of express port, the particular system port 194 provides direct express connectivity from one ROADM instance to another, typically co-located within the same site and may be connected via a patch cable when within the same chassis or may be connected via one or more waveguide when within the same node. The optical interface model of the logical system port 312 having an express port port type (not shown) of the particular system port 194 subsumes the direct express connectivity. As shown in FIG. 6A, logical system ports 312 having an express port type are not modeled for inter-degree/inter-node connectivity but are instead shown as a cross-connection 320 (discussed below).

In one implementation, the line port 192 provides for optical communication with a component external to the ROADM such as for optical communication with a ROADM instance located at a different site, e.g., a downstream network element 14. The logical line port 308 is an optical interface model for the line port 192.

Figure 6B:
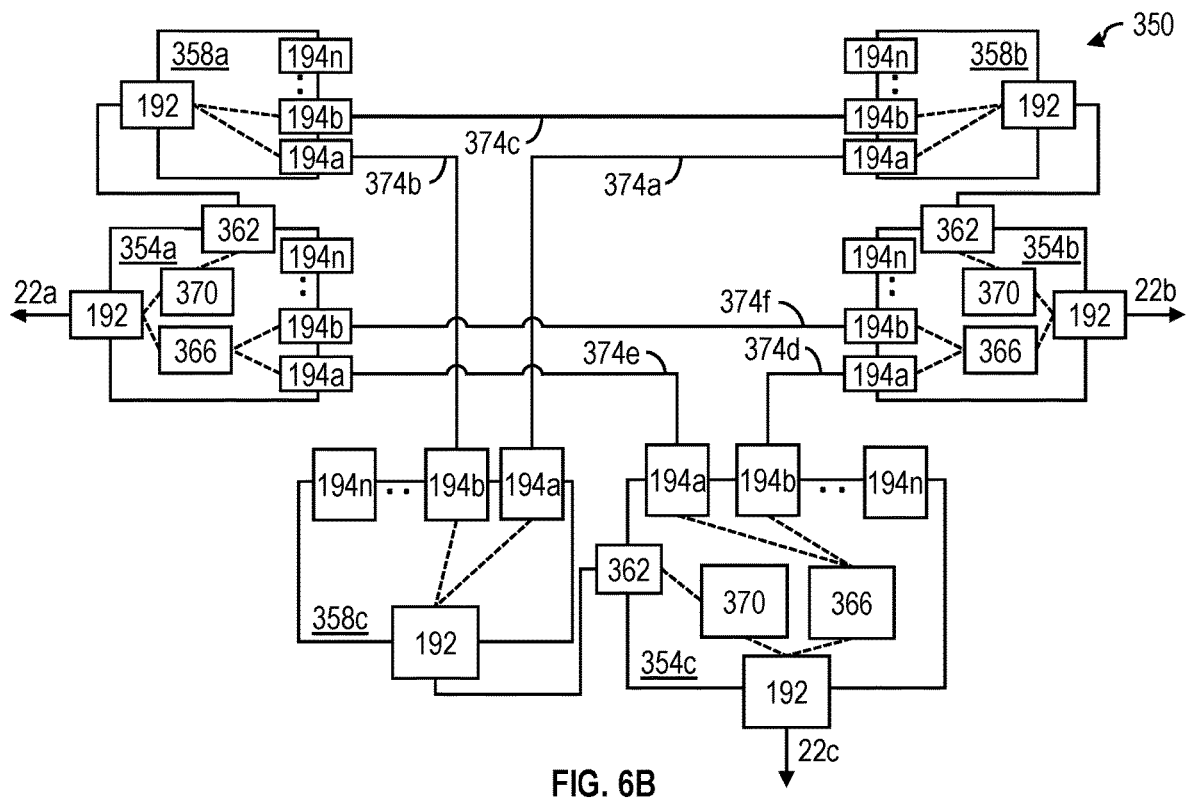
FIG. 6B is a block diagram of another exemplary implementation of a physical topology of a ROADM constructed in accordance with the present disclosure.

In one implementation, each connectivity matrix 315 described connectivity between pairs of optical interfaces, such as the logical line port 308 and one or more logical system port 312. A cross-connection 320 from a first optical interface to a second optical interface may be completed if the cross-connection 320 is defined in the connectivity matrix 316. The cross-connection 320 may define connectivity both between add/drop ports and line ports, and between express ports and line ports 192 when the logical ROADM model 300 includes more than one logical line port 308. For example, as shown in FIG. 6B, a first cross-connection 320a, defined in the first connectivity matrix 316a and the second connectivity matrix 316b as an express connection, is shown between the first logical line port 308a and the second logical line port 308b and a second cross-connection 320b, defined in the first connectivity matrix 316a as an express connection, is shown between the logical system port 312a-1 and the first logical line port 308a.

In one implementation, each cross-connection 320 is unidirectional while the optical connection is bidirectional because a first state of the FRM 110 operating in a first degree is independent of a second state of the FRM 110 operating in a second degree. In this implementation, with the logical ROADM model 300 modeling each cross-connection 320 in a first direction (e.g., from an upstream node to a downstream node), a second logical ROADM model may be created for a second direction opposite the first direction (e.g., from the downstream node to the upstream node).

In one implementation, each optical interface supports one of C-Band, L-Band, or C+L-Band.

In some implementations, only line ports 192 (and thus logical line ports 308) support C+L-Band while system ports 194 (and thus logical system ports 312) support either C-Band or L-Band, but not C+L-Band. In this implementation, separate entries in the connectivity matrix 316 may be defined for C-Band connectivity (i.e., from a C-Band FRM 354, described below) and L-Band connectivity (i.e., from an L-Band FRM 358, described below). For example, a first connectivity entry may be defined in the first connectivity matrix 316a for connectivity of the first logical system port 312a-1 supporting the C-Band, while a second connectivity entry may be defined in the first connectivity matrix 316a for connectivity of the third logical system port 312a-3 supporting the L-Band. In this way, each logical FRM model 304 of the logical ROADM model 300 is a consolidation of functions of the C-Band FRM 354 and the L-Band FRM 358. In one implementation, the C-Band FRM 354 is an FRM-20X-C and the L-Band FRM 358 is an FRM-20X-L.

Referring now to FIG. 6B, shown therein is a block diagram of an exemplary embodiment of a physical topology of a ROADM 350 constructed in accordance with the present disclosure. Generally, the ROADM 350 includes a C-Band FRM 354 and an L-Band FRM 358 for each degree. As shown in exemplary FIG. 6B, the ROADM 350 includes a first L-Band FRM 358a coupled to a first C-Band FRM 354a, and a second L-Band FRM 358b coupled to a second C-Band FRM 354b, and a third L-Band FRM 358c coupled to a third C-Band FRM 354c. The ROADM 350 of FIG. 6B is shown as a three-degree ROADM, however, the ROADM 350 may have more than three degrees or fewer than three degrees.

In one implementation, the first L-Band FRM 358a generally comprises a plurality of system ports 194a-n selectably optically coupled to the line port 192. The line port 192 of the first L-Band FRM 358a is optically coupled to an expansion port 362 of the first C-Band FRM 354a. The first C-Band FRM 354a generally comprises a plurality of system ports 194a-n selectably optically coupled to a C-Band connection termination point (e.g., a C-Band CTP 366) and the expansion port 362 is optically coupled to an L-Band CTP 370. The C-Band CTP 366 and the L-Band CTP 370 are optically combined and coupled to the line port 192 of the first C-Band FRM 354a. The line port 192 of the first C-Band FRM 354a may be coupled to an optical fiber link 22 such as the first transmission line segment 22a, for example. As used here, a connection termination point (or CTP) is a logical connection termination point.

In one implementation, as shown in FIG. 6B, an express connection 374 is formed connecting at least one system port 194 of each L-Band FRM 358 to each other L-Band FRM 358. For example, as shown, a first express connection 374a optically links the first system port 194a of the second L-Band FRM 358b and the first system port 194a of the third L-Band FRM 358c, a second express connection 374b optically links the first system port 194a of the first L-Band FRM 358a and the second system port 194b of the third L-Band FRM 358c, and a third express connection 374c optically links the second system port 194b of the first L-Band FRM 358a and the second system port 194b of the second L-Band FRM 358b.

In one implementation, as shown in FIG. 6B, an express connection 374 is formed connecting at least one system port 194 of each C-Band FRM 354 to each other C-Band FRM 354. For example, as shown, a fourth express connection 374d optically links the first system port 194a of the second C-Band FRM 354b and the second system port 194b of the third C-Band FRM 354c, a fifth express connection 374e optically links the first system port 194a of the first C-Band FRM 354a and the first system port 194a of the third C-Band FRM 354c, and a sixth express connection 374f optically links the second system port 194b of the first C-Band FRM 354a and the second system port 194b of the second C-Band FRM 354b.

In one implementation, the second L-Band FRM 358b and the second C-Band FRM 354b are generally constructed and coupled similar to the first L-Band FRM 358a and the first C-Band FRM 354a as described above. Similarly, the third L-Band FRM 358c and the third C-Band FRM 354c are generally constructed and coupled similar to the first L-Band FRM 358a and the first C-Band FRM 354a as described above.

Referring back to FIG. 6A, in combination with FIG. 6B, in one implementation, each connectivity matrix 316 may be applied to a ROADM 350 to abstract physical ports of the ROADM 350 into logical ports of the logical ROADM model 300. For example, the first connectivity matrix 316a may abstract the line port 192 of the first C-Band FRM 354a, the line port 192 of the third C-Band FRM 354c, the first system port 194a of the first L-Band FRM 358a, the second system port 194b of the third L-Band FRM 358c, the first system port 194a of the first C-Band FRM 354a, and the first system port 194a of the third C-Band FRM 354c into the second cross-connection 320b. Additionally, the first connectivity matrix 316a may abstract the line port 192 of the first C-Band FRM 354a, the line port 192 of the second C-Band FRM 354b, the second system port 194b of the first L-Band FRM 358a, the second system port 194b of the second L-Band FRM 358b, the second system port 194b of the first C-Band FRM 354a, and the second system port 194b of the second C-Band FRM 354b into the first cross-connection 320a.

Similarly, the second connectivity matrix 316b may abstract the line port 192 of the second C-Band FRM 354b, the line port 192 of the third C-Band FRM 354c, the first system port 194a of the second L-Band FRM 358b, the first system port 194a of the third L-Band FRM 358c, the first system port 194a of the second C-Band FRM 354b, and the second system port 194b of the third C-Band FRM 354c into the third cross-connection 320c. Additionally, the second connectivity matrix 316b may abstract the line port 192 of the second C-Band FRM 354b, the line port 192 of the first C-Band FRM 354a, the second system port 194b of the second L-Band FRM 358b, the second system port 194b of the first L-Band FRM 358a, the second system port 194b of the second C-Band FRM 354b, and the second system port 194b of the first C-Band FRM 354a into the first cross-connection 320a.

Further, the third connectivity matrix 316c may abstract the line port 192 of the third C-Band FRM 354c, the line port 192 of the first C-Band FRM 354a, the first system port 194a of the first L-Band FRM 358a, the second system port 194b of the third L-Band FRM 358c, the first system port 194a of the first C-Band FRM 354a, and the first system port 194a of the third C-Band FRM 354c into the second cross-connection 320b. Additionally, the third connectivity matrix 316c may abstract the line port 192 of the second C-Band FRM 354b, the line port 192 of the third C-Band FRM 354c, the first system port 194a of the second L-Band FRM 358b, the first system port 194a of the third L-Band FRM 358c, the first system port 194a of the second C-Band FRM 354b, and the second system port 194b of the third C-Band FRM 354c into the third cross-connection 320c.

Figure 7:
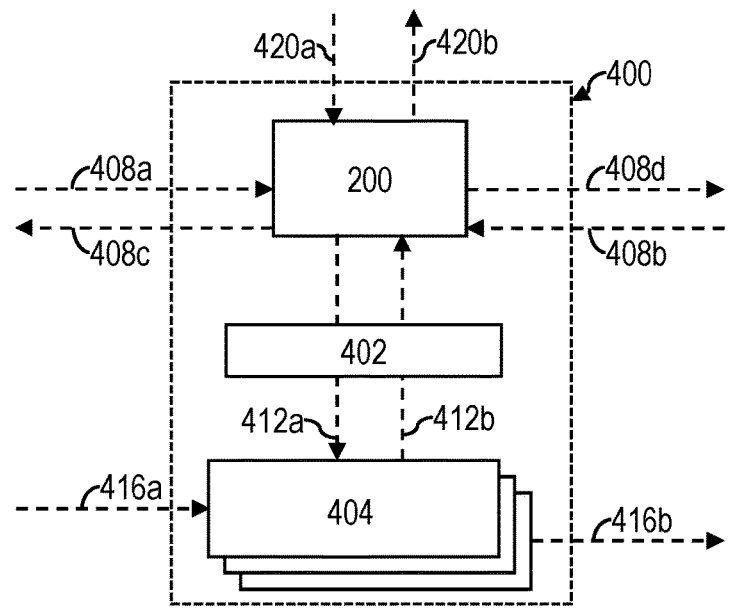
FIG. 7 is a functional model of an exemplary implementation of an optical services and power controls sub-system constructed in accordance with the present disclosure.

Referring now to FIG. 7, shown therein is a functional model of an exemplary implementation of an optical services and power controls sub-system 400 (hereinafter sub-system 400), constructed in accordance with the present disclosure. In some implementations, as shown in FIG. 7, the sub-system 400 is an implementation of the software application 58 of the computer system 30, the software application 96 of the network element(s) 14, and/or the FRM application 189 described above and operable to perform an action such as communicate with or control one or more component of the computer system 30, the optical transport network 10 (e.g., one or more of the network elements 14) and/or the communication network 34.

In one implementation, the sub-system 400 may be implemented on a ROADM and comprises the SPCO 200, a power control agent 402 (hereinafter, PCA 402) and one or more control block 404. The one or more control block 404 may be operable to control one or more component of the network element 14 via an optical power control-related configuration of the optical transport network 10 (i.e., by adjusting one or more attenuation level and/or one or more gain associated with the network element 14) such that a target optical power level in the optical fiber link 22 is maintained within a tolerance level of optimal levels at all times. Maintaining such a target optical power level may have the effect of guaranteeing that receiving equipment (i.e., the light sink 100 of a receiving network element 14) receives a higher-quality signal with a good Signal-to-Noise Ratio (SNR) and minimal distortion. In one implementation, each of the one or more control block 404 may be associated with one or more component of the ROADM. For example, referring to FIG. 6B, one or more first control block 404 may be associated with the C-Band FRM 354 and one or more second control block 404 may be associated with the L-Band FRM 358. In one implementation, the SPCO 200 deployed on the C-Band FRM 354 can control the L-Band FRM 358 coupled thereto.

In some implementations, the SPCO 200 is operable to control one or more optical power control-related configuration of the network element 14 and/or the control block 404 thereof, via the PCA 402. In one implementation, exemplary components of the network element 14 controlled by one or more control block 404 includes a WSS, an EDFA, an optical channel monitor, a variable optical attenuator, a Raman pump, and other optical devices, for example. In one implementation, the control blocks 404 may be specific to the component of the network element 14 the SPCO 200 is deployed to, and, in some implementations, may be product dependent. For example, optical functions and topology for the network element components are usually modelled as a second level expansion of the logical ROADM model 300 (described below). The optical components are primarily used to carry out optical power control functions on the associated equipment. Additionally, because power control functions are delegated to existing local controls (e.g., input power controls (INPC), MCL and DMCL) and link level optical power controls, the SPCO 200 and/or the orchestrator 202 are not required to model fined grained optical topology; however, the SPCO 200 and/or orchestrator 202 do need to know what optical control blocks are supported in on the platform in which the SPCO 200 is deployed.

Each control block 404 may comprise at least one of a MUX control block 404a operable to control one or more optical power control-related configuration of a MUX WSS, a DEMUX control block 404b operable to control one or more optical power control-related configuration of a DEMUX WSS, and a link control block 404c operable to control one or more link level optical power such as optical power control-related configuration of one or more optical amplifier (OA) and/or variable optical attenuator (VOA) and/or in the optical fiber link 22.

In one implementation, the MUX control block 404a may adjust one or more passband configuration and/or one or more attenuation of the "MUX" WSSs. Such adjustments may be made by the MUX control block 404a on a per-passband basis. In one implementation, the DEMUX control block 404b may adjust one or more passband configuration and/or one or more attenuation of the "DEMUX" WSSs. Such adjustments may be made by the DEMUX control block 404b on a per-passband basis and/or on a per slice basis. In some implementations, the functions of the MUX control block 404a and the DEMUX control block 404b may be performed by a single control block 404.

In one implementation, the link control block 404c may adjust one or more configuration, one or more attenuation, and/or one or more gain for one or more in-line optical component 260 (such as the optical amplifier (OA) and/or variable optical attenuator (VOA) in the optical fiber link 22). Such adjustments may be made on a per-band basis (i.e., the C-band, the L-band, or C/L-band).

In one implementation, each control block 404 exposes one or more functionalities, including common functionalities, such as 'sync control block' and 'get status of control block'. Other functionalities may be exposed based on the type of the control block. For example, the MUX control block 404a and the DEMUX control block 404b may expose functionalities including 'activate passband request', 'deactivate passband request", 'block passband request", 'enable adjustment request", 'disable adjustment request", and/or the like. The link control block 404c may expose 'adjust gain request", 'enable gain adjust request", 'disable gain adjust request", 'activate band request", 'deactivate band request", and/or the like. In one implementation, the PCA 402 operates as a standardized (or abstracted) interface for exposing the above functionalities of individual control blocks 404 to the SPCO 200. For example, the PCS 212 may also send update from the PCA (via a notification channel) regarding one or more of a control block state such as a 'state update', 'passband state update', 'band info update', 'link control update', and/or the like.

In some implementations, the SPCO 200 is operable to control one or more optical power control-related configuration of the control blocks 404 via the PCA 402. For example, the SPCO 200 may send one or more PCO request and/or loading request to the PCA 402. Additionally, the SPCO 200 may receive one or more PCO response, loading response, passband state, and/or control block state from the PCA 402. In the case that the SPCO 200 sends a loading request to the PCA 402 (e.g., to activate and/or deactivate a group of passbands), the PCA 402 translates abstracted commands of the loading request to hardware commands for the control blocks 404. The control block 404 may then act on the loading request, perform activation and/or deactivation for a group of passbands, and sends the loading response to the PCA 402, which receives the loading response and converts the loading response to a logical abstraction accessible by the orchestrator 202 and/or SPCO 200, e.g., in conjunction with the OTSA 204. In some implementations, the control block 404 may also send one or more state update for the passbands in the group of passbands, a state of the control block 404 pertaining to power control loop functionality, and/or other supplementary information such as state of one of the one or more bands and/or an optical link state.

In one implementation, the SPCO 200 may be operable to receive and/or send an inter-node communication 408, e.g., to upstream and/or to downstream ROADMS and/or network elements 14. For example, the SPCO 200 may receive a first inter-node communication 408a from an upstream direction, may receive a second inter-node communication 408b from a downstream direction, may send a third inter-node communication 408c in the upstream direction, and may send a fourth inter-node communication 408d in the downstream direction. Such orchestration may have the effect of minimizing the impact the SRS tilt effect has on pre-existing optical services in the optical transport network 10. For example, the SPCO 200 may be operable to receive and/or send the inter-node communication 408 to one or more of an upstream orchestrator application (e.g., an SPCO 200 operating on an upstream network element) or a downstream orchestrator application operating on a downstream network element.

In one implementation, each of the inter-node communications 408 may be one or more of a PCO request 412a, a passband loading state, a PCO response 412b, a passband loading status, and/or a health status update.

In some implementations, the PCA 402 may transmit PCO requests 412a to the control block(s) 404 and may receive PCO responses 412b and/or health status updates from the control block(s) 404. In one implementation, each PCO request 412a originates from an upstream ROADM (e.g., via the first inter-node communication 408a). When the orchestrator 202 of the SPCO 200 receives the PCO request 412a from the first inter-node communication 408a, the SPCO 200 issues the PCO request 412a to the PCA 402 which, in turn, transmits the PCO request 412a to a particular control block 404. The particular control block 404 may act on the PCO request 412a and transmit the PCO response 412b back towards the orchestrator 202. The SPCO 200 may then send a consolidated PCO response back to the upstream ROADM, e.g., via the third inter-node communication 408c. The PCO request 412a may be one or more of a disable adjust request, Mux WSS control adjustment request, adjust link control request, and/or an enable adjustment request.

In one implementation, the PCO request 412a is a disable adjust request issued by an orchestrator deployed on the upstream ROADM to the SPCO 200 to disable automatic WSS and link level optical power controls. The disable adjust request further suspends local loading on all mux degrees. When the SPCO 200 receives the disable adjust request and transmits the disable adjust request to the MUX control block 404a on all dependent mux degrees, the MUX control block 404a stores a reference power level.

In one implementation, the PCO request 412a is a Mux WSS controls adjust request issued by an orchestrator on the upstream ROADM to the SPCO 200 to adjust cause the mux WSS to meet a reference power level in a MUX control block 404a for all dependent express services on all dependent mux degrees.

In one implementation, the PCO request 412a is an adjust link control request issued by an orchestrator on the upstream ROADM to the SPCO 200 to adjust link amplifier controls in a link control block 404c to meet an optical power target on all dependent mux degrees.

In one implementation, the PCO request 412a is an enable adjust request issued by an orchestrator on the upstream ROADM to the SPCO 200 to enable autonomous WSS and link level optical power controls (e.g., suspend optical power adjustments, enable optical power adjustments, etc.) in the MUX control block 404a and the link control block 404c running on all dependent mux modules. Further, it enables loading on all dependent mux degrees.

In one implementation, the PCO request 412a may originate from the orchestrator on the upstream ROADM where passband loading is performed and sent to the SPCO 200 through the OCP 208. The OCP 208, in turn, ensures that the PCO request 412a is sent to the orchestrator 202, which, in turn, sends the PCO request 412a to the control block 404 via the PCA 402. In one implementation, once, the SPCO 200 sends the consolidated PCO response the upstream ROADM, the OCP 208 again ensures that the PCO response 412b is transmitted to the orchestrator on the upstream ROADM.

In one implementation, each control block 404 may send and/or receive controls data 416. For example, the control block 404 may receive upstream controls data 416a from an upstream network element 14 and may transmit downstream controls data 416b to a downstream network element 14. The controls data 416 may include one or more data indicative of one or more of an optical power value, an SNR value, a carrier density, an amplified spontaneous emission (ASE) value, and/or the like.

In one implementation, the SPCO 200 may receive service control requests and/or configuration information 420a from a northbound layer and may transmit service status information 420b to the northbound layer. In some implementations, the northbound layer may be a management layer, for example.

Figure 8:
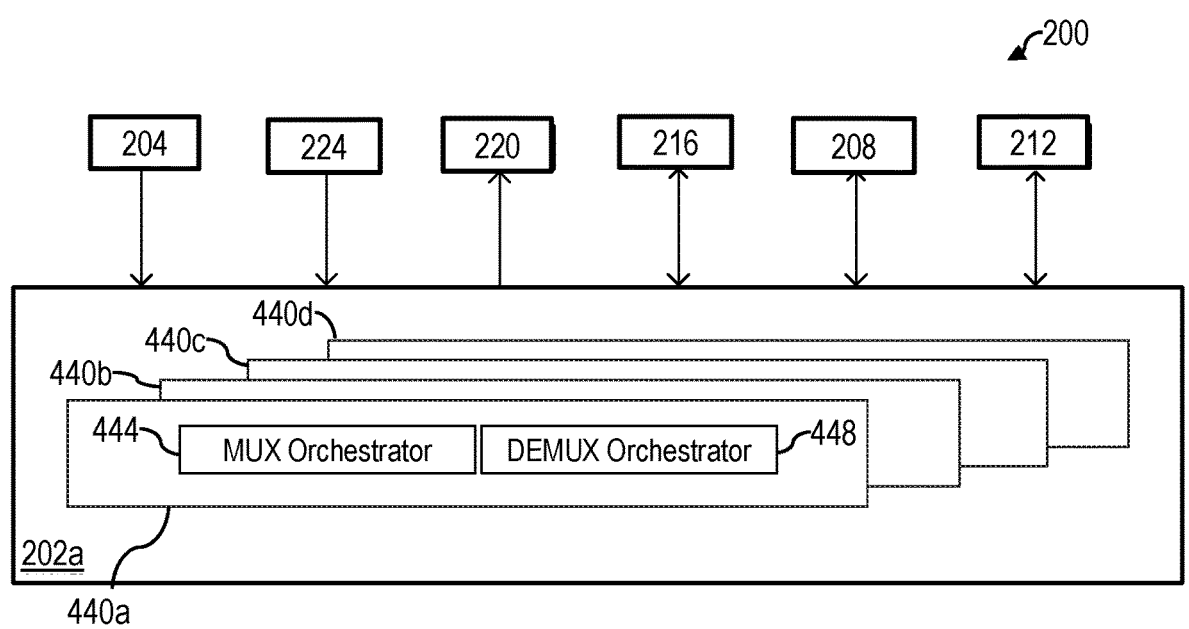
FIG. 8 is a block diagram of an exemplary implementation of an orchestrator implemented on a ROADM with multiple degrees and constructed in accordance with the present disclosure.

Referring now to FIG. 8, shown therein is a block diagram of an exemplary implementation of the SPCO 200 implemented on a ROADM and constructed in accordance with the present disclosure. The SPCO 200 comprises a first orchestrator 202a constructed in accordance with the orchestrator 202 as detailed above and refers to the orchestrator 202 when stored as the software application 96 of the network element 14 and/or the FRM application 189 in the node memory 94 or the FRM memory 188, and executed by the node processor 90 or the FRM processor 186, respectively. As shown, the first orchestrator 202a is implemented on a ROADM and is composed of and orchestrates activities of one or more degree orchestrator 440a-n (shown as first, second, third, and fourth degree orchestrators 440a through 440d), while each degree orchestrator 440a-d operates independently of each other degree orchestrator 440a-n.

In one implementation, each degree orchestrator 440a-n is constructed in accordance with the orchestrator 202 with the exception that the degree orchestrator 440a-n is in communication with the OTSA 204 to receive the logical FRM model 304 as an FRM abstraction type while the first orchestrator 202a is in communication with the OTSA 204 to receive the logical ROADM model 300 and the logical FRM model 304 for each degree of a ROADM as a ROADM abstraction type. In one implementation, when the first orchestrator 202a is running on an FRM 110, the first orchestrator 202a would include only one degree orchestrator 440. The OTSA 204 reports an abstraction type (e.g., FRM/degree abstraction associated with the logical FRM model or a ROADM abstraction associated with the logical ROADM model) with degree provisioning to the first orchestrator 202a.

In one implementation, each degree orchestrator 440 comprises a MUX orchestrator 444 and a DEMUX orchestrator 448. In one implementation, the MUX orchestrator 444 orchestrates activities of outgoing optical signals, such as ingress to the optical fiber link 22 including any line amplifier controls (e.g., implemented in link level optical power control in link control blocks 404c) and multiplexer WSS controls, such as in MUX control blocks 404a. Conversely, the DEMUX orchestrator 448 orchestrates activities of incoming optical signals, such as ingress to the FRM 110 from the optical fiber link 22 and including any receiver line amplifier controls (e.g., implemented in link level optical power control in link control blocks 404c) and demultiplexer WSS controls such as in DEMUX control blocks 404b.

In one implementation, each of the MUX orchestrator 444 and the DEMUX orchestrator 448 maintain a passband state, e.g., a passband level FSM, with respect to orchestration based at least in part on a passband state in MUX control blocks 404a and DEMUX control blocks 404b. In one implementation, and based on the passband state, each of the MUX orchestrator 444 and the DEMUX orchestrator 448 make loading related decisions and/or delegate loading related decisions to one or more other service component of the SPCO 200.

Figure 9:
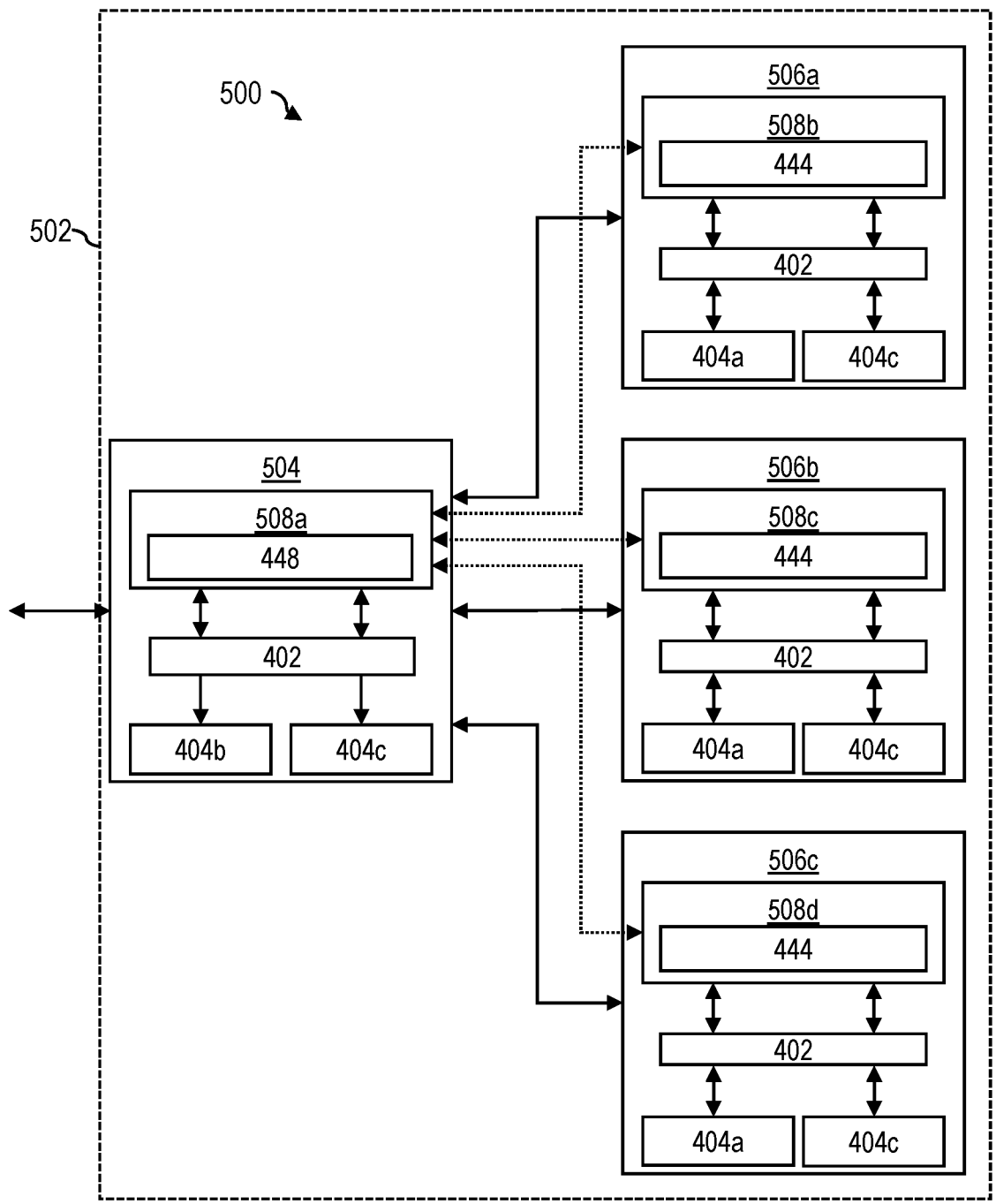
FIG. 9 is a block diagram of an exemplary implementation of an orchestrator network constructed in accordance with the present disclosure.

Referring now to FIG. 9, shown therein is a control diagram of an exemplary implementation of an orchestrator network 500 constructed in accordance with the present disclosure. The orchestrator network 500 deployed within a ROADM 502. The ROADM 502 generally comprises a DEMUX WSS 504 optically coupled to a first MUX WSS 506a, a second MUX WSS 506b, and a third MUX WSS 506c. The DEMUX WSS 504 comprises a first SPCO 508a having the DEMUX orchestrator 448 in communication with the PCA 402. The PCA 402 in the DEMUX WSS 504 is in communication with the DEMUX control block 404b and the link control block 404c in the DEMUX WSS 504. The first MUX WSS 506a comprises a second SPCO 508b having the MUX orchestrator 444 in communication with the PCA 402. The PCA 402 in the first MUX WSS 506a is in communication with the MUX control block 404a and the link control block 404c in the first MUX WSS 506a. The second MUX WSS 506b comprises a third SPCO 508c having the MUX orchestrator 444 in communication with the PCA 402. The PCA 402 in the second MUX WSS 506b is in communication with the MUX control block 404a and the link control block 404c in the second MUX WSS 506b. And, the third MUX WSS 506c comprises a fourth SPCO 508d having the MUX orchestrator 444 in communication with the PCA 402. The PCA 402 in the third MUX WSS 506c is in communication with the MUX control block 404a and the link control block 404c in the third MUX WSS 506c.

The first SPCO 508a, the second SPCO 508b, the third SPCO 508c, and the fourth SPCO 508d may each be constructed in accordance with the SPCO 200 as described above in more detail. Each of the SPCOs 508 may be deployed at an FRM 110 for each degree of the ROADM, that is, for each degree of the ROADM 502, the SPCO 508 may be deployed to the FRM 110 associated with that degree, e.g., the SPCO 508 may be stored in the FRM memory 188 as the FRM software application 189 and executed by the FRM processor 186.

In one implementation, as shown in FIG. 9, the ROADM 502 is an express ROADM such as the second network element 14b illustrated above with the exception that the ROADM 502 is a four-degree ROADM. Further, the DEMUX WSS 504 may be constructed in accordance with the first WSS 108a of the second network element 14b, the first MUX WSS 506a may be constructed in accordance with the fourth WSS 108d of the second network element 14b, and the second MUX WSS 506b may be constructed in accordance with the sixth WSS 108f of the second network element 14b. Additionally, the third MUX WSS 506c may be constructed in accordance with any of the second WSS 108b, the fourth WSS 108d, and the sixth WSS 108f with the exception that the third MUX WSS 506c is associated with a different degree than that of any of the second WSS 108b, the fourth WSS 108d, and the sixth WSS 108f.

In one implementation, within the DEMUX WSS 504, the DEMUX orchestrator 448, which is part of the first SPCO 508a, works as an overlay over the receive direction (e.g., the demux direction) of the optical controls, that is, the first SPCO 508a works as an overlay over the receive line amplifier controls (e.g., in the link control block 404c in the DEMUX WSS 504) and the DEMUX control block 404b. And, within each MUX WSS 506, the MUX orchestrator 444, which is part of the SPCO 508 in each MUX WSS 506, works as an overlay over the transmit direction (e.g., the mux direction) of the optical controls, that is, the SPCO 508 in each MUX WSS 506, works as an overlay over the transmit line amplifier controls (e.g., link control block 404c) and the MUX control block 404a.

Figure 10:
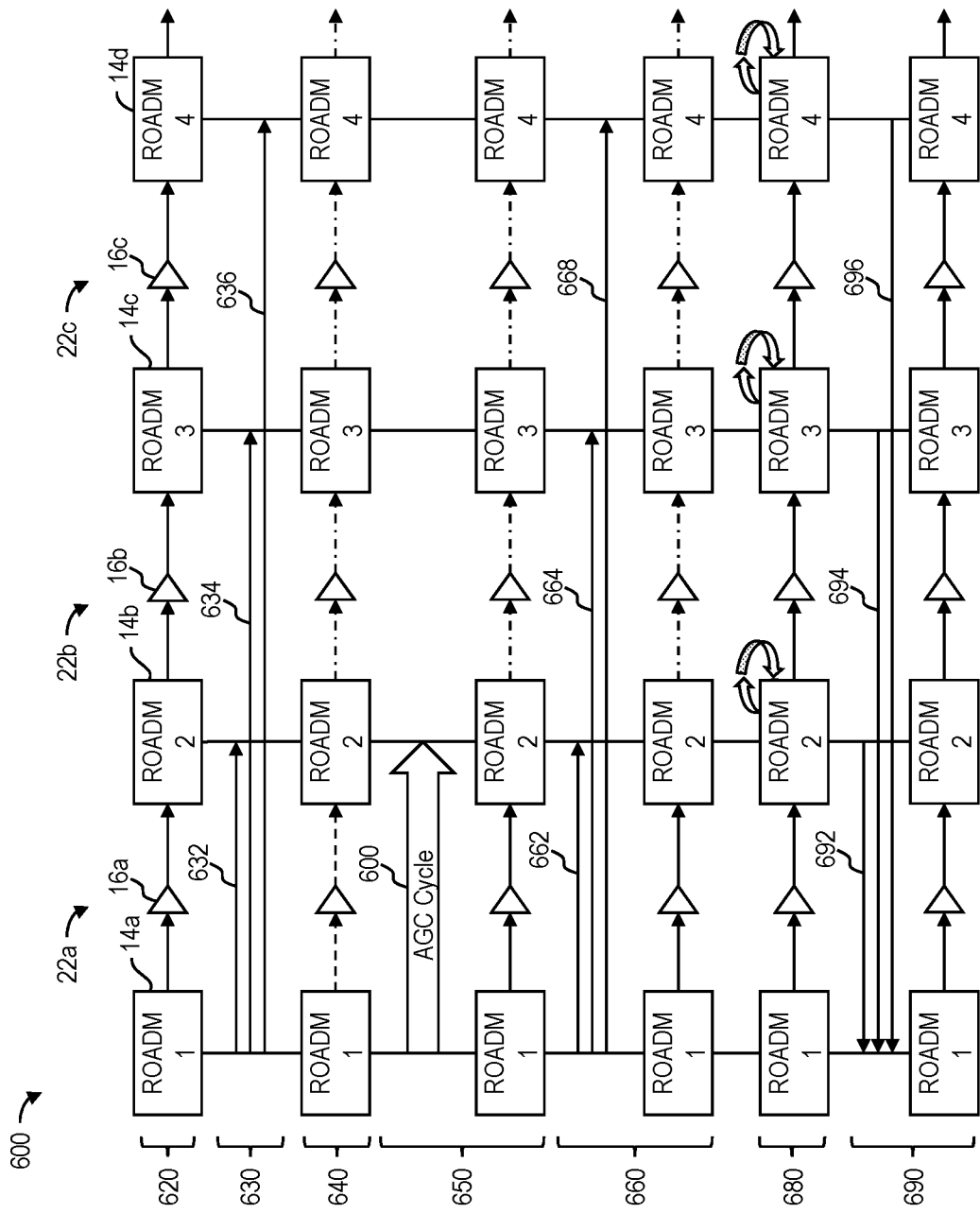
FIG. 10 is a flow chart of an exemplary loading sequence of one implementation of an optical transport network constructed in accordance with the present disclosure.
Figure 12E:
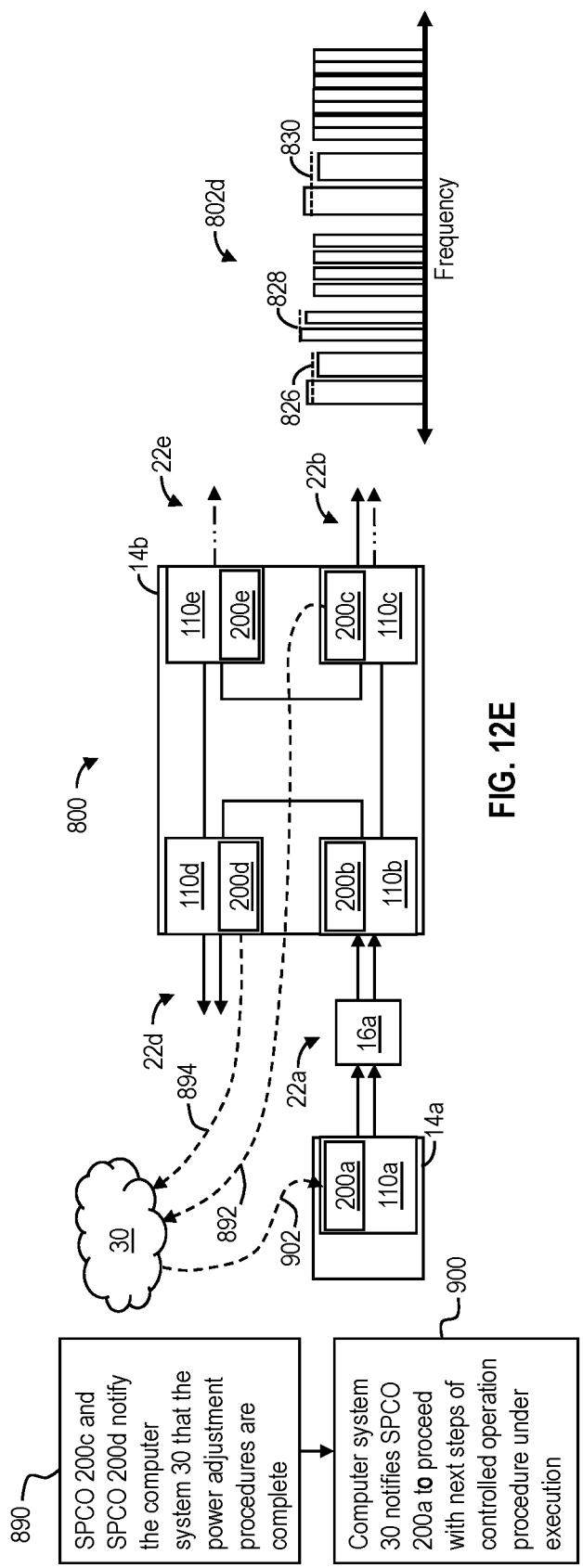

Referring now to FIG. 10, shown therein is an exemplary loading sequence of an exemplary implementation of an optical transport network 600. The optical transport network 600 is similar to the optical transport network 10 described above. Therefore, in the interest of brevity, only the differences will be described in detail herein.

The optical transport network 600 may be provided with the first network element 14a, the first ILA 16a, the second network element 14b, the second ILA 16b, the third network element 14c, the third ILA 16c, and the fourth network element 14d. The first transmission line segment 22a of the optical transport network 600 connects the first network element 14a to the second network element 14b, the second transmission line segment 22b connects the second network element 14b to the third network element 14c, and the third transmission line segment 22c connects the third network element 14c to the fourth network element 14d.

At step 620, the optical transport network 600 is operating in a normal gain control cycle with optical set points optimized and optical signals in the C Band wavelengths and L Band wavelengths, for instance, travelling between the first network element 14a, the second network element 14b, the third network element 14c, and the fourth network element 14d as represented by solid arrows.

In step 630, in preparation for carrying out or responding to a network state change, the SPCO 200a of the first network element 14a sends a first signal 632, a second signal 634, and a third signal 636 to network elements 14b, 14c, and 14d, respectively, downstream from the first network element 14a. The first, second, and third signals 632, 634, and 636 causing the downstream network elements 14b, 14c, and 14d to determine and store a power set point value for each active passband for all degrees carrying express traffic sourced from the first network element 14a.

In step 640, the SPCO 200a on the first network element 14a carries out or responds to the network state change which may be, for example, a controlled action (e.g., adding and/or removing wavelengths), or an uncontrolled action (e.g., change in fiber span loss, unexpected equipment failure).

In step 650, the SPCO 200a on the first network element 14a performs an AGC cycle to re-optimize the operating set points of the first transmission line segment 22a.

In step 660, the SPCO 200a on the first network element 14a sends a fourth signal 662 to the SPCO 200b on the second network element 14b, a fifth signal 664 to the SPCO 200c on the third network element 14c, and a sixth signal 668 to the SPCO 200d on the fourth network element 14d, the fourth signal 662, fifth signal 664, and the sixth signal 668 configured to cause the second network element 14b, the third network element 14c, and the fourth network element 14d to perform a power adjustment (which may be referred to as a "ForceAdjust") on each active passband originating from the first transmission line segment 22a.

It should be noted that any degree of the second network element 14b, the third network element 14c, and the fourth network element 14d that does not have any express traffic originating from the first transmission line segment 22a will not perform the power adjustment.

In step 680, SPCO 200b on the second network element 14b, SPCO 200c on the third network element 14c, and SPCO 200d on the fourth network element 14d perform the power adjustment on each active passband originating from the first transmission line segment 22a. The power adjustment may be performed by a MUX control loop, for instance, to adjust the power of all active passbands using the stored power set point values from step 630.

Once the power adjustment is completed, in step 690 the SPCO 200b on the second network element 14b sends a seventh signal 692, the SPCO 200c on the third network element 14c sends an eight signal 694, and the SPCO 200d on the fourth network element 14d sends a ninth signal 696 to the SPCO 200a on the first network element 14a, the seventh, eighth, and ninth signals 692, 694, and 696 indicating that the power adjustments have been completed successfully.

Once the SPCO 200a on the first network element 14a receives the seventh, eighth, and ninth signals 692, 694, and 696 indicating that the power adjustments have been completed successfully, the SPCO 200a on the first network element 14a may proceed with any next steps in the procedure under execution. For instance, if the procedure under execution requires multiple operations that must be run sequentially, the SPCO 200a may be programmed to begin a next operation in the sequence after receiving confirmation that the power adjustments were completed successfully. If the next operation in the sequence requires power adjustments that may affect downstream nodes (e.g., the second network element 14b, the third network element 14c, and the fourth network element 14d), the SPCO 200a may be programmed to begin the loading sequence again at step 630 to prevent power excursions from accumulating in the downstream nodes without the need to run AGC cycles on the downstream nodes after each operation in the sequence.

When controlled operations are executed on a local transmission line segment (e.g., transmission line segment 22a), residual power excursions will propagate to downstream segments via egress express traffic from the first network element 14a, for instance. These power excursions may be due to a number of causes, including, but not limited to: adding wavelengths, removing wavelengths, amplifier gain shape changes, spectral hole burning, missed power control loops targets, open-loop power control errors, and uncompensated spectral tilt. Because the residual power excursions propagate via express traffic, a multi-degree network element may have degrees with traffic that is unaffected by the controlled operations. As a result, power adjustments may not be necessary on all degrees of every multi-degree network element in an optical network.

As explained above, in one implementation of the presently disclosed concepts, an SPCO may be deployed on all degrees of a ROADM, e.g., all FRM 110 of a network element 14 may be provided with an SPCO. In such implementations, the SPCO 200 forms adjacency with neighboring SPCO 200 instances, e.g., a deployed instance of the SPCO 200 on other degrees of a same one of the network element 14 and/or with one or more SPCO 200 deployed on a neighboring network element 14. This adjacency may be used to determine optical traffic patterns including whether or not an FRM 110 has express traffic from a given transmission line segment. Or, in other words, whether or not the adjacent FRM 110 would be affected by controlled operations executed on the given transmission line segment.

It should be noted that the network 600 of FIG. 10. is illustrated a linearized network topology (i.e., each network element 14 has two degrees). However, the network may be provided with multi-degree network elements 14 as described above with respect to FIG. 3A, for instance having more than two degrees.

It should also be noted that in some implementations, in step 630, only the first signal 632 may be sent to the second network element 14b. In other words, in some implementations, it is optional to send the second signal 634 to the third network element 14c and the third signal 636 to the fourth network element 14d. In such an implementation, it may only be necessary to run the power adjustment (step 660) on each active passband originating from the first transmission line segment 22a on the second network element 14b but not on the third network element 14c or the fourth network element 14d.

Referring now to FIGS. 11A-11E, shown therein is an exemplary loading sequence of an exemplary implementation of an optical transport network 700. The optical transport network 700 is similar to the optical transport network 10 described above. Therefore, in the interest of brevity, only the differences will be described in detail herein.

The optical transport network 700 may be provided with the first network element 14a, the first ILA 16a, and the second network element 14b. The first transmission line segment 22a of the optical transport network 700 connects a first FRM 110a of the first network element 14a to a second FRM 110b of the second network element 14b. The optical transport network 700 is further illustrated with a second transmission line segment 22b that carries optical signals from the third FRM 110c of the second network element 14b, a third transmission line segment 22c that carries optical signals from the fourth FRM 110d of the second network element 14b, and a fourth transmission line segment 22d that carries optical signals from the fifth FRM 110e of the second network element 14b. Active services that originate on the first network element 14a are represented by solid arrows and active services that originate from other degrees or a local ADD (e.g., light source 104) are illustrated as a dash-dot-dot line to differentiate origination of the active services in FIG. 11. An exemplary passband power level graph 702 is provided to further illustrate the disclosed concepts.

The first network element 14a is shown with a node level SPCO 200a while each FRM 110b-110e of the second network element 14b is shown having an SPCO 200b-200e deployed therein. It should be noted, however, that this exemplary setup is shown for the purposes of illustration only and other implementations of the first network element 14a, for instance, may be provided having a SPCO 200 deployed within each degree.

The first network element 14a may store information such as an adjacency graph (as described above with regard to FIG. 5) with information about downstream network elements such as the second network element 14b. The adjacency graph may include information regarding a number of degrees of the downstream network element(s) as well as traffic information such as which degrees of the downstream network element carry express traffic and would be affected by controlled operations executed on a local transmission line segment such as transmission line segment 22a. The adjacency graph may be accessible by the SPCO 200a of the first network element 14a for use as will be described herein. Direct adjacency dependency relationships may be built from service provisioning information and/or the OCP protocol 208 of the SPCO 200a. The OCP protocol 208 uses nearest neighbor communication, so demux FRMs know which MUX FRMs they are expressing traffic to. To build dependencies beyond a single hop (i.e., an adjacent neighbor), a dependency matrix for each service crossing through a segment of interest (e.g., 22a) and all the dependent network paths that the egress traffic takes in the network 700 (e.g., 22b, 22c, 22d, 22e, etc.) may be built. For instance, a network graph database that stores nodes and relationships may be used. One such network graph database is Neo4j®.

In step 710, in preparation for executing a loading operation, the SPCO 200a of the first network element 14a accesses network information such as the adjacency graph and determines which degrees of the downstream network element (the second network element 14b) carry express traffic and would be affected by loading operations on the first transmission line segment 22a (in the illustrated example, the third FRM 110c and the fourth FRM 110d would be affected while the fifth FRM 110e does not carry any express traffic) and sends a request (which may be in the form of a first signal 712 and a second signal 714, for instance) to all adjacent degrees (third FRM 110c and fourth FRM 110d) with express traffic sourced from the first transmission line segment 22a to determine and store power set point values for each active passband during a normal gain control cycle. For the purposes of illustration, three power set points (first set point 716, second setpoint 718, and third setpoint 720) are shown as dotted lines overlaying the passband power level graph 702.

In step 730, the SPCO 200a executes the loading operation on the first transmission line segment 22a which causes express traffic from the second FRM 110b to undergo a residual power change due to loading operation upstream. This change is represented by changed lines representing the passbands going from the third FRM 110c and the fourth FRM 110d as well as an updated passband power level graph 702a with the three power set points (first set point 716, second setpoint 718, and third setpoint 720) overlaying new passband power levels.

In step 740, the SPCO 200a sends a first signal 712 to the fourth SPCO 200d on the fourth FRM 110d and a second signal 714 to the third SPCO 200c on the third FRM 110c, the first signal 712 and the second signal 714 configured to cause the fourth SPCO 200d and the third SPCO 200c to perform a power adjustment operation on each of the fourth FRM 110d and the third FRM 110c to correct for the power excursions propagating downstream from the first transmission segments 22a egress, and returns the downstream transmission line segments 22b and 22c to the last known good operating point.

In step 760, the third SPCO 200c performs the power adjustment operation on the third FRM 110c and the fourth SPCO 200d performs the power adjustment operation on the fourth FRM 110d to adjust a power of all passbands originating from the first transmission line segment 22a via express to target powers using the first set point 716, second setpoint 718, and third setpoint 720 save in step 730. For instance, the third SPCO 200c and the fourth SPCO 200d may trigger a ROADM MUX control loop (i.e., a control loop responsible for adjusting the passband power levels within a MUX WSS such as a fourth WSS 108d of the third FRM 110c and a sixth WSS 108f of the fourth FRM 110d) in each of the third FRM 110c and the fourth FRM 110d to adjust the power of the passbands.

In step 780, the third SPCO 200c is configured to send a first signal 782 and the fourth SPCO 200d is configured to send a second signal 782 to the first SPCO 200a of the first network element 14a configured to notify the first SPCO 200a that the power adjustment operations were completed successfully. Successful completion of the power adjustment operations means that is it not necessary to run a full AGC cycle on the downstream transmission line segment (e.g., the second transmission line segment 22b and/or the third transmission line segment 22c) because the power excursion originating from the first transmission line segment 22a egress is corrected at an ingress of the second transmission line segment 22b and the third transmission line segment 22c.

If the passband-level power adjustments are not successful, then a full AGC cycle is required for the transmission line segment that failed. Possible reasons that the power adjustment operations might fail include, but are not limited to: WSS dynamic range is exhausted and saved power setpoint or target (e.g., the first set point 716, the second setpoint 718, and/or the third setpoint 720) cannot be met; a passband power measured after the power adjustment operations is too far from the saved power target (i.e., a delta power threshold has been exceeded); equipment failure or lack of access (e.g., OPM cannot be read, WSS does not adjust); and communications timeout.

Referring now to FIGS. 12A-12E, shown therein is an exemplary loading sequence of an exemplary implementation of an optical transport network 800. The optical transport network 800 is similar to the optical transport network 10 and the optical transport network 700 described above. Therefore, in the interest of brevity, only the differences will be described in detail herein.

The optical transport network 800 may be provided with the first network element 14a, the first ILA 16a, the second network element 14b, and the computer system 30 which acts as a centralized control point that is connected to all of the network elements of the optical transport network 800. As describe above, the computer system 30 may be cloud-based. The first transmission line segment 22a of the optical transport network 700 connects the first FRM 110a of the first network element 14a to the second FRM 110b of the second network element 14b. The optical transport network 800 is further illustrated with the second transmission line segment 22b that carries optical signals from the third FRM 110c of the second network element 14b, the third transmission line segment 22c that carries optical signals from the fourth FRM 110d of the second network element 14b, and the fourth transmission line segment 22d that carries optical signals from the fifth FRM 110e of the second network element 14b. Active services or passbands that originate on the first network element 14a are represented by solid arrows and active services that originate from other degrees or a local ADD (e.g., light source 104) are illustrated as a dash-dot-dot line to differentiate the origination of the active services in FIGS. 12A-12E. An exemplary passband power level graph 802 is provided to further illustrate the disclosed concepts.

Each FRM 110a-110e is shown having an SPCO 200a-200e deployed therein. It should be noted, however, that this exemplary setup is shown for the purposes of illustration only and other implementations of the first network element 14a and the second network element, for instance, may be provided having a single SPCO 200 that connects with and controls power loading operations for multiple degrees in the first network element 14a and the second network element as described herein.

The computer system 30 and/or each of the first network element 14a and the second network element 14b may store information such as an adjacency graph (as described above with regard to FIG. 5) with information about network elements that are part of the optical network 800 such as the first network element 14a and the second network element 14b. The adjacency graph may include information regarding a number of degrees of the downstream network element(s) as well as traffic information such as which degrees of the downstream network element carry express traffic and would be affected by state changes on a local transmission line segment such as transmission line segment 22a. The adjacency graph may be accessible by the SPCO 200 of the computer system 30 for use as will be described herein.

In step 810, in preparation for executing a loading operation, which may be a controlled loading operation, on the first transmission line segment 22a, the SPCO 200a of the first network element 14a sends a request (which may be in the form of a first signal 812) to save current passband power on adjacent dependent degrees to an SPCO 200 of the computer system 30. The computer system 30 may be programmed to process the request and determine all adjacent degrees with express traffic sourced from the first transmission line segment 22a. In the illustrated example, the third FRM 110c and the fourth FRM 110d are shown as carrying express traffic from the first transmission line segment 22a while the fifth FRM 110e does not carry express traffic from the first transmission line segment 22a. As a result, in step 820 the SPCO 200 of the computer system 30 may be programmed to send a request to save current passband powers to the third FRM 110c and the fourth FRM 110d but not the fifth FRM 110e. The request to save the current passband powers may be sent in the form of a data signal such as a first data signal 822 sent to the third FRM 110c and a second data signal 824 sent to the fourth FRM 110d.

Upon receiving the request to save current passband powers, the SPCO 200c of the third FRM 110c and the fourth SPCO 200d of the fourth FRM 110d may be programmed to determine and save the current passband powers which may be expressed as power set points such as a first power set point 826, a second power set point 828, and a third power set point 830 which are shown as dotted lines overlayed on the passband power level graph 802 for purposes of illustration only.

In step 840, the computer system 30 sends a signal to the SPCO 200a indicating that the SPCO 200a may begin the loading operation. In step 850, the SPCO 200a executes the loading operation on the first transmission line segment 22a which causes express traffic from the second FRM 110b to undergo a residual power change due to the loading operation. This change is represented by changed lines representing the passbands going from the third FRM 110c and the fourth FRM 110d as well as an updated passband power level graph 802a with the three power set points (first set point 826, second setpoint 828, and third setpoint 830) overlaying new passband power levels.

In step 860, the SPCO 200a sends a signal 862 to the computer system 30 indicating that the loading operation (or at least one part of a sequence) is complete.

In step 870, the computer system 30 sends a first signal 872 to the third SPCO 200c on the third FRM 110c and a second signal 874 to the fourth SPCO 200d on the fourth FRM 110d, the first signal 872 and the second signal 874 configured to cause the third SPCO 200c and the fourth SPCO 200d to perform a power adjustment operation on each of the fourth FRM 110d and the third FRM 110c to correct for the power excursions propagating downstream from the first transmission segments 22a egress, and return the downstream transmission line segments 22b and 22c to the last known good operating point.

In step 880, the third SPCO 200c performs the power adjustment operation on the third FRM 110c and the fourth SPCO 200d performs the power adjustment operation on the fourth FRM 110d to adjust a power of all passbands originating from the first transmission line segment 22a via express to target powers using the first set point 826, second setpoint 828, and third setpoint 830 saved in step 820. For instance, the third SPCO 200c and the fourth SPCO 200d may trigger a ROADM MUX control loop in each of the third FRM 110c and the fourth FRM 110d to adjust the power of the passbands.

In step 890, the third SPCO 200c sends a first signal 892 and the fourth SPCO 200d sends a second signal 894 to the computer system 30 configured to notify the computer system 30 that the power adjustment procedures are complete and were successful. Successful completion of the power adjustment operations means that is it not necessary to run a full AGC cycle on the downstream transmission line segment (e.g., the second transmission line segment 22b and/or the third transmission line segment 22c) because the power excursion originating from the first transmission line segment 22a egress is corrected at an ingress of the second transmission line segment 22b and the third transmission line segment 22c.

If the power adjustment procedures are not successful, then a full AGC cycle is required for each transmission line segment that failed.

In step 900, the computer system 30 sends a signal 902 to the first SPCO 200a indicating that the SPCO 200a may proceed with next steps of the loading procedure, if any.

From the above description, it is clear that the inventive concept(s) disclosed herein are well adapted to carry out the objects and to attain the advantages mentioned herein, as well as those inherent in the inventive concept(s) disclosed herein. While the implementations of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element, comprising:
   a processor;
   a first line port optically coupled to a first optical fiber link carrying a first optical signal having a first plurality of passbands;
   a flexible ROADM module including a wavelength selective switch in optical communication with the first line port, a multiplexer, and one or more control block, and being operable to selectively multiplex the first optical signal into a second optical signal having a second plurality of passbands, the one or more control block operable to control the wavelength selective switch and the multiplexer;

a second line port optically coupled to a second optical fiber link and operable to carry the second optical signal having the second plurality of passbands, the second line port in optical communication with the wavelength selective switch; and a memory comprising a non-transitory processor-readable medium storing an orchestrator application having one or more service component, and storing processor-executable instructions that when executed by the processor cause the processor to:

responsive to receiving a first signal indicative of an impending network state change, pause all power adjustments by the control block on the flexible ROADM module and save at least one power set point value for each active passband from the first optical signal multiplexed into the second optical signal, the network state change being responsive to service activation or service deactivation affecting the first optical signal;

responsive to receiving a second signal indicative of the network state change, adjust an optical power of each active passband from the first optical signal multiplexed into the second optical signal using the power set point values.

2. The network element of claim 1, wherein the one or more service component is an orchestration control protocol, and wherein the orchestration control protocol, in communication with the orchestration application, determines the at least one power set point value for each active passband from the first optical signal multiplexed into the second optical signal and saves the at least one power set point value for each active passband in the memory.

3. The network element of claim 1, wherein adjusting the optical power of each active passband from the first optical signal multiplexed into the second optical signal using the power set point values is defined further as providing instructions to the wavelength selective switch to cause the wavelength selective switch to selectively attenuate wavelengths of light within at least one active passband.

4. The network element of claim 1, wherein adjusting the optical power of each active passband from the first optical signal multiplexed into the second optical signal using the power set point values is defined further as providing instructions to the wavelength selective switch to cause the wavelength selective switch to selectively amplify wavelengths of light within at least one active passband.

5. The network element of claim 1, wherein adjusting the optical power of each active passband from the first optical signal multiplexed into the second optical signal using the power set point values is defined further as adjusting the power level of each passband independently of other passbands.

6. The network element of claim 1, wherein adjusting the optical power of each active passband from the first optical signal multiplexed into the second optical signal using the power set point values is defined further as dynamically adjusting the power level of passbands based on real-time network conditions.

7. The network element of claim 1, wherein the degree further comprises an optical power monitor configured to measure the power level of individual passbands and provide feedback to the processor for adjusting the power levels.

8. The network element of claim 1, wherein after the optical power of each active passband from the first optical signal multiplexed into the second optical signal is adjusted using the power set point values, the processor executable instructions cause the processor to determine if a delta power threshold value relative to the power set point values for each active passband from the first optical signal multiplexed into the second optical signal has been exceeded; and if the delta power threshold value relative to the power set point values for each active passband from the first optical signal multiplexed into the second optical signal has not been exceeded, the processor executable instructions cause the processor to generate and transmit a third signal via the first line port, the third signal indicating the optical power adjustment of each active passband from the first optical signal multiplexed into the second optical signal was successful; or if the delta power threshold value relative to the power set point values for each active passband from the first optical signal multiplexed into the second optical signal has been exceeded, the processor executable instructions cause the processor to generate and transmit a fourth signal via the first line port, the fourth signal indicating the optical power adjustment of each active passband from the first optical signal multiplexed into the second optical signal was not successful.

9. A network element, comprising:

a first flexible ROADM module comprising:
   a first system port;
   a second system port;
   a first line port optically coupled to a first optical fiber link carrying a first optical signal having a first group of passbands;
   a first processor; and
   a first memory comprising a non-transitory processor-readable medium storing a first orchestrator application having one or more first service component, and storing first processor-executable instructions;

a second flexible ROADM module comprising:
   a third system port;
   a fourth system port;
   a second line port optically coupled to the first line port of the first flexible ROADM module;
   a second processor; and
   a second memory comprising a non-transitory processor-readable medium storing a second orchestrator application having one or more second service component, and storing second processor-executable instructions;

a third flexible ROADM module comprising:
   a fifth system port;
   a sixth system port;
   a third line port optically coupled to the first line port of the first flexible ROADM module;
   a third processor; and
   a third memory comprising a non-transitory processor-readable medium storing a third orchestrator application having one or more third service component, and storing third processor executable instructions;

wherein the second processor-executable instructions, when executed by the second processor, cause the second processor to:

responsive to receiving a first signal indicative of an impending network state change, pause all power adjustments by a second control block on the second flexible ROADM module and save at least one first power set point value for each active passband from the first group of passbands from the first flexible ROADM module, the network state change being responsive to service activation or service deactivation affecting the first optical signal; and responsive to receiving a second signal indicative of the network state change, adjust an optical power of each active passband from the first optical signal using the first power set point values; and wherein the third processor-executable instructions, when executed by the third processor cause the third processor to:

responsive to receiving the first signal indicative of the impending network state change, pause all power adjustments by a third control block on the third flexible ROADM module and save at least one second power set point value for each active passband from the first group of passbands from the first flexible ROADM module, the network state change being responsive to service activation or service deactivation affecting the first optical signal; and responsive to receiving the second signal indicative of the network state change, adjust an optical power of each active passband from the first optical signal using the second power set point values.

10. The network element of claim 9, wherein the one or more first service component is a first orchestration control protocol, the one or more second service component is a second orchestration control protocol, and the one or more third orchestration protocol is a third orchestration control protocol; and wherein the second orchestration control protocol, in communication with the second orchestration application, determines the at least one first power set point value for each active passband from the first group of passbands from the first flexible ROADM module and saves the at least one first power set point value for each active passband in the second memory; and wherein the third orchestration control protocol, in communication with the third orchestration application, determines the at least one second power set point value for each active passband from the first group of passbands from the first flexible ROADM module and saves the at least one second power set point value for each active passband in the third memory.

11. The network element of claim 9, wherein adjusting the optical power of each active passband from the first optical signal using the first power set point values and the second power set point values is defined further as adjusting the power level of each passband independently of other passbands.

12. The network element of claim 9, wherein adjusting the optical power of each active passband from the first optical signal using the first power set point values and the second power set point values is defined further as dynamically adjusting the power level of passbands based on real-time network conditions.

13. The network element of claim 9, wherein the second flexible ROADM module further comprises a second optical power monitor configured to measure the power level of individual passbands and provide feedback to the second processor for adjusting the optical powers; and wherein the third flexible ROADM module further comprises a third optical power monitor configured to measure the power level of individual passbands and provide feedback to the third processor for adjusting the optical powers.

14. An optical transport network, comprising:

a first network element comprising a first processor, a first wavelength selective switch having a first line port and a first system port, and a first memory comprising a non-transitory processor-readable medium storing a first orchestrator application having at least one first service component, and first processor-executable instructions;

a second network element comprising a second processor, a second wavelength selective switch having a second line port and a second system port and exposing a control block, and a second memory comprising a non-transitory processor-readable medium storing a second orchestrator application having at least one second service component, and second processor-executable instructions; and an optical fiber link optically coupled to the first line port and the second line port, the optical fiber link operable to carry an optical signal having the optical service in a plurality of passbands;

wherein the first processor executable instructions, when executed by the first processor, cause the first processor to generate a first signal and transmit the first signal via the first line port to the second network element, the first signal indicative of an impending state change on the first network element;

responsive to receiving the first signal, the second processor executable instructions cause the second processor to pause all power adjustments by the control block and save at least one power set point value for each active passband in the optical signal;

responsive to saving at least one power set point for each active passband in the optical signal, the second processor executable instructions cause the second processor to generate a second signal and transmit the second signal to the first network element via the second line port, the second signal indicating that the second network element is prepared for the state change;

responsive to receiving the second signal, the first processor executable instructions cause the first network element to perform the state change;

responsive to completing the state change, the first processor executable instructions cause the first processor to generate a third signal and transmit the third signal to the second network element via the first line port, the third signal indicating that the state change is complete;

responsive to receiving the third signal, the second processor executable instructions cause the second processor to adjust an optical power of each active passband in the optical signal using the power set point values.

15. The optical network of claim 14, wherein after the optical power of each active passband in the optical signal is adjusted using the power set point values, the second processor executable instructions cause the second processor to determine if a delta power threshold value relative to the power set point values for each active passband in the optical signal has been exceeded; and if the delta power threshold value relative to the power set point values for each active passband in the optical signal has not been exceeded, the second processor executable instructions cause the second processor to generate a fourth signal and transmit the fourth signal to the first network element via the second line port, the fourth signal indicating the optical power adjustment of each active passband in the optical signal was successful; or if the delta power threshold value relative to the power set point values for one or more of the active passbands in the optical signal has been exceeded, the second processor executable instructions cause the second processor to generate a fifth signal and transmit the fifth signal to the first network element via the second line port, the fifth signal indicating the optical power adjustment of each active passband in the optical signal was not successful.

16. The optical network of claim 15, wherein the state change is a multi-step state change and responsive to receiving the fourth signal, the first processor executable instructions cause the first network element to perform a second step in the state change.

17. The optical network of claim 14, wherein the one or more second service component is a second orchestration control protocol, and wherein the second orchestration control protocol, in communication with the second orchestration application, determines the at least one power set point value for each active passband in the optical signal and saves the at least one power set point value for each active passband in the second memory.

18. The optical network of claim 17, wherein adjusting the optical power of each active passband in the optical signal using the power set point values is defined further as providing instructions to the second wavelength selective switch to cause the second wavelength selective switch to selectively attenuate wavelengths of light within at least one active passband in the optical signal.

19. The optical network of claim 17, wherein adjusting the optical power of each active passband in the optical signal using the power set point values is defined further as providing instructions to the second wavelength selective switch to cause the second wavelength selective switch to selectively amplify wavelengths of light within at least one active passband in the optical signal.

20. The optical network of claim 14, wherein adjusting the optical power of each active passband in the optical signal using the power set point values is defined further as adjusting the power level of each active passband independently of other passbands.

* * * * *